(12) United States Patent
Maruyama et al.

(10) Patent No.: US 8,607,564 B2
(45) Date of Patent: Dec. 17, 2013

(54) AUTOMOBILE-MOUNT DIESEL ENGINE WITH TURBOCHARGER AND METHOD OF CONTROLLING THE DIESEL ENGINE

(75) Inventors: Keiji Maruyama, Hiroshima (JP);
Masaki Ushitani, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 330 days.

(21) Appl. No.: 13/162,534

(22) Filed: Jun. 16, 2011

(65) Prior Publication Data

US 2012/0000197 A1    Jan. 5, 2012

(30) Foreign Application Priority Data

Jun. 30, 2010 (JP) ................................. 2010-148714
Apr. 14, 2011 (JP) ................................. 2011-090028

(51) Int. Cl.
| | | |
|---|---|---|
| F02D 23/00 | (2006.01) | |
| F02B 33/44 | (2006.01) | |
| F02M 25/07 | (2006.01) | |
| F02B 3/00 | (2006.01) | |
| F02M 51/00 | (2006.01) | |

(52) U.S. Cl.
USPC ............ 60/601; 60/605.2; 701/108; 123/299; 123/478; 123/568.12; 123/568.21

(58) Field of Classification Search
CPC ..... F02D 41/40; F02D 41/402; F02D 41/401; F02D 41/403; F02D 41/405; F02D 41/0065; F02D 41/3035; F02D 2250/38; F02D 2250/36; F02D 2041/0017; F02D 41/057; F02D 41/3064; F02D 2041/3052; F02M 25/0707; F02B 1/12; F02B 1/14

USPC ......................... 60/605.2, 600–602, 285, 295; 701/104–105, 108; 123/299, 300, 478, 123/568.12, 568.21

IPC ........................................................ F02M 25/07
See application file for complete search history.

(56) References Cited

U.S. PATENT DOCUMENTS

| | | | | |
|---|---|---|---|---|
| 6,240,721 | B1 * | 6/2001 | Ito et al. .......................... 60/285 |
| 6,591,818 | B2 * | 7/2003 | Sasaki et al. ............. 123/568.12 |
| 6,666,020 | B2 * | 12/2003 | Tonetti et al. .................. 123/299 |
| 6,688,279 | B2 * | 2/2004 | Ishikawa et al. .............. 123/299 |
| 6,941,929 | B2 * | 9/2005 | Shinzawa ................. 123/568.21 |
| 7,171,957 | B2 * | 2/2007 | Liu et al. .................. 123/568.12 |
| 8,131,449 | B2 * | 3/2012 | Koyama et al. ................ 701/105 |
| 8,171,914 | B2 * | 5/2012 | Atzler et al. ................... 701/103 |

(Continued)

FOREIGN PATENT DOCUMENTS

| | | | | |
|---|---|---|---|---|
| JP | 2009293383 A | | 12/2009 | |
| JP | 2010144625 A | * | 7/2010 | ............. F02M 25/07 |

*Primary Examiner* — Thai Ba Trieu
(74) *Attorney, Agent, or Firm* — Alleman Hall McCoy Russell & Tuttle LLP

(57) ABSTRACT

An automobile-mount diesel engine with a turbocharger is provided, which includes an engine body with the turbocharger, the engine body being mounted in the automobile and supplied with fuel containing diesel fuel as its main component, a fuel injection valve arranged in the engine body so as to be oriented toward a cylinder of the engine body and for directly injecting the fuel into the cylinder, an injection control module for controlling a mode of injecting the fuel into the cylinder through the fuel injection valve, and an EGR amount control module for adjusting an amount of EGR gas introduced into the cylinder. EGR and fuel injection are adjusted based on speed-load conditions of the engine.

14 Claims, 14 Drawing Sheets

(56) References Cited

U.S. PATENT DOCUMENTS

| | | |
|---|---|---|
| 2003/0033800 A1* | 2/2003 | Tonetti et al. .................... 60/285 |
| 2003/0070650 A1* | 4/2003 | Ishikawa et al. .............. 123/299 |
| 2003/0150420 A1* | 8/2003 | Ishikawa et al. .............. 123/300 |
| 2009/0293453 A1* | 12/2009 | Sujan .............................. 60/285 |
| 2010/0116243 A1* | 5/2010 | Koyama et al. ................ 123/299 |
| 2011/0060514 A1* | 3/2011 | Nada ............................. 701/104 |
| 2011/0139136 A1* | 6/2011 | Guo et al. ................. 123/568.12 |
| 2011/0320108 A1* | 12/2011 | Morinaga et al. ............. 701/105 |

* cited by examiner

FIG.10 (a)
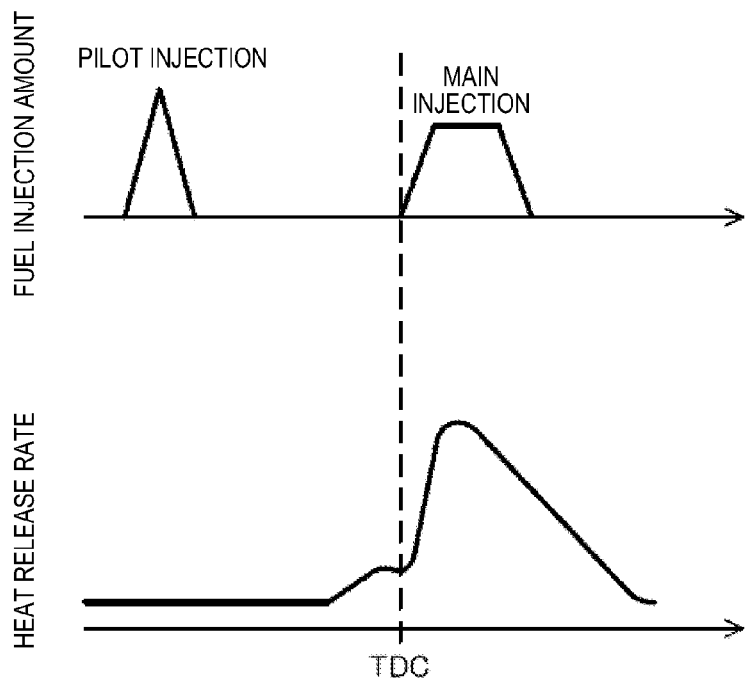
FIG. 10 (b)
FIG. 11 (a)
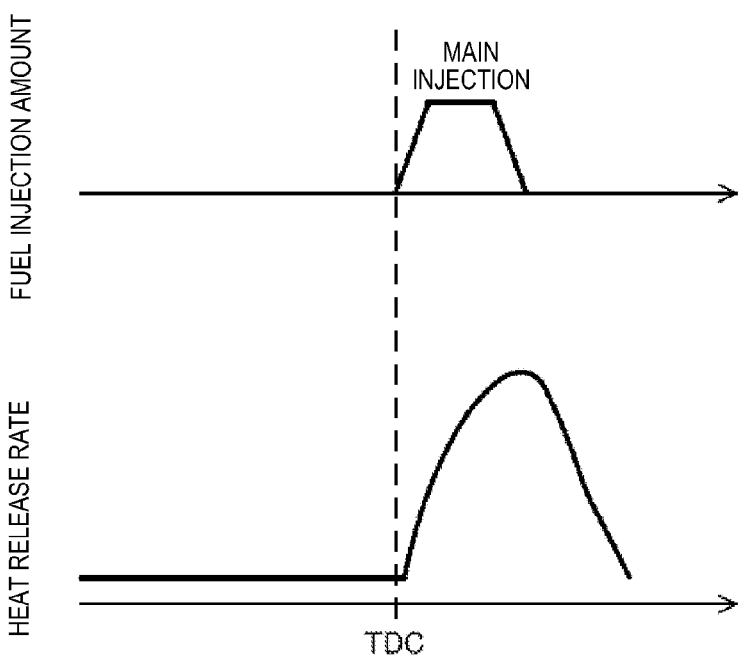
FIG. 11 (b)

OPERATING RANGE G
(DASHED LINE)

OPERATING RANGE F
(SOLID LINE)

TDC

AUTOMOBILE-MOUNT DIESEL ENGINE WITH TURBOCHARGER AND METHOD OF CONTROLLING THE DIESEL ENGINE

BACKGROUND

The present invention relates to an automobile-mount diesel engine with a turbocharger, and particularly relates to a control of a fuel injection in the diesel engine.

In automobile-mount diesel engines, a fuel injection is performed in each of cylinders for more than once during one cycle of the engine in order to, for example, reduce NOx and soot contained in exhaust gas, reduce noises or vibrations, and improve a fuel consumption and torque. For example, JP2009-293383A discloses a diesel engine with a turbocharger that performs fuel injections at five timings: a main injection for generating a torque, a pilot injection performed prior to the main injection so as to preheat cylinders, a pre-injection performed between the pilot injection and the main injection so as to suppress an ignition delay of fuel injected by the main injection, an after injection performed after the main injection so as to raise a temperature of exhaust gas, and a post injection for raising a temperature of a catalyst by directly introducing the fuel to an exhaust system subsequent to the after injection.

Meanwhile, in the diesel engine, an EGR (Exhaust Gas Recirculation) for re-circulating combusted gas is performed particularly within a partial load range within a low engine speed range (here, the partial load range is defined as a range with a middle load when an operating range of the engine is partitioned into three ranges, high, middle and low loads, respectively, and the low engine speed range is defined when an operating range of the engine is partitioned into two ranges, the low engine speed range and a high engine speed range) so that a discharge amount of NOx is reduced. However, within an operating range where a large amount of EGR gas is introduced, an amount of air inside cylinders decreases, and therefore, it is disadvantageous in reducing the soot discharge. In such case, performing pre-stage injection twice, such as the pilot injection and the pre-injection, prior to the main injection, as disclosed in JP2009-293383A, increases a premixture ratio of fuel and is beneficial in reducing the soot.

Within such an operating range of the engine where the load is higher than within the operating range where the large amount of the EGR gas is introduced, for a turbo charged engine, a turbocharging amount increases and an injection amount of the fuel increases as a result of the increased load, and thus, an ignitability within the cylinders is improved. Therefore, within the relatively high load range, where the ignitability is improved, performing the pre-stage injection twice increases a heat release rate (dQ/dθ) in a pre-combustion before a main combustion caused by the main injection to be comparatively higher. Thus, two high peaks of the heat release rates are generated in the pre-combustion and the main combustion, and thereby, combustion noises with low frequency in the combustions overlap with each other and become louder and cause a problem of degradation in an NVH (Noise, Vibration and Harshness) performance. Particularly, because the partial load range within the low engine speed range is comparatively frequently utilized, and the degradation of the NVH performance easily becomes a problem.

SUMMARY

The present invention is made in view of the above situations and provides an automobile-mount diesel engine with a turbocharger, that can reduce a discharge amount of soot and improve an NVH performance within a certain operating range where EGR gas is introduced into a cylinder.

According to one aspect of the invention, an automobile-mount diesel engine with a turbocharger is provided, which includes an engine body with the turbocharger, the engine body being mounted in the automobile and supplied with fuel containing diesel fuel as its main component, a fuel injection valve arranged in the engine body so as to be oriented toward a cylinder of the engine body and for directly injecting the fuel into the cylinder, an injection control module for controlling a mode of injecting the fuel into the cylinder through the fuel injection valve, and an EGR amount control module for adjusting an amount of EGR gas introduced into the cylinder. When the engine body is at least within a predetermined operating range where a rotation speed is low and a load is partial, the EGR amount control module introduces the EGR gas into the cylinder, and the injection control module performs a main injection where the fuel is injected at or near a top dead center in a compression stroke to cause a main combustion mainly including a diffusion combustion and performs a pre-stage injection where the fuel is injected prior to the main injection.

Within a range where the load is relatively low within the predetermined operating range, the injection control module also switches to a first injection mode in which the pre-stage injection with a predetermined injection ratio with respect to a fuel injection amount of the main injection is performed, and, within a range where the load is relatively high within the predetermined operating range, the injection control module switches to a second injection mode in which the injection ratio for the pre-stage injection is reduced to be lower than in the first injection mode and a post-stage injection where the fuel is injected after the main injection to extend the main combustion is performed. The post-stage injection is partially performed at a timing in which the injected fuel reaches outside a cavity formed in a top surface of a piston inserted into the cylinder.

As described above, when the engine body is at least within the predetermined operating range where the rotation speed is low and the load is partial (particularly a middle load), the EGR amount control module introduces the EGR gas into the cylinder and, thereby, causes a disadvantage regarding suppressing the generation of soot. Therefore, within a range where the engine load is relatively low within the predetermined operating range, the injection control module injects the fuel with the predetermined injection ratio with respect to the fuel injection amount of the main injection by the pre-stage injection where the fuel is injected prior to the main injection where the fuel is injected at near the top dead center in the compression stroke, that is the fuel is injected during the compression stroke by the pre-stage injection (the first injection mode). By increasing the amount of the fuel to be injected by the pre-stage injection, a premixture level of the fuel increases and befits in suppressing the generation of the soot.

On the other hand, within the range where the engine load is relatively high within the predetermined operating range, a turbocharging amount by the turbocharger and a total fuel injection amount increase compared to the range where the engine load is relatively low. Thereby, by performing the pre-stage injection with comparatively large injection amount similar to the first injection mode within the range where the engine load is relatively low, a heat release rate in a pre-combustion caused before the main combustion is excessively increased and an NVH performance may degrade. Therefore, the fuel injection module reduces the injection ratio of the pre-stage injection to the main injection in the second injection mode to be less than that in the first injection mode within the range where the engine load is relatively high. The reduction of the injection ratio contributes to improving the NVH performance.

However, although the NVH performance is improved, a premixture ratio is reduced because particularly the fuel injection amount by the main injection increases and, on the other hand, the fuel injection amount by the pre-stage injection decreases as described above corresponding to the increase of the engine load within the range where the engine load is relatively high. Thereby, the soot may easily be generated. Therefore, the post-stage injection where the fuel is injected after the main injection is performed in the second injection mode. The post-stage injection is performed at a timing so that the main combustion is extended and partially performed at a timing in which the injected fuel reaches outside a cavity formed in a top surface of a piston inserted into the cylinder. Thereby, a temperature decrease in the cylinder during the expansion stroke after a peak of a heat release rate in the main combustion is suppressed and the temperature in the cylinder is kept high. In other words, a time period of remaining in an OH area of a ø-T map (ø=local equivalent ratio and T=local temperature) in the latter stage of the combustion stroke is extended to promote oxidation of the soot by utilizing air outside the cavity. As a result, the discharge of the soot can be reduced as much as possible.

Thus, within the predetermined operating range where the EGR gas is introduced into the cylinder by the EGR control module, by switching between the first and second injection modes according to the level of the load on the engine body, the suppression in the discharge of the soot together with the improvement of the NVH performance can be achieved.

According to the finding by the inventors of the present invention, in the engine body configured to have a comparatively low geometric compression ratio so as to, for example, improve thermal efficiency, an ignitability decreases within the range where the engine load is relatively low within the operating range where the rotation speed is low and the load is partial. Here, in the first injection mode, performing the pre-stage injection with the predetermined injection ratio with respect to the fuel injection amount of the main injection particularly for a plurality of times causes the pre-combustion (pre-stage combustion) with an appropriate heat release rate at a predetermined timing before the top dead center in the compression stroke and benefits in shortening an ignition delay of the fuel injected by the main injection. That is, performing the pre-stage injection with the predetermined injection ratio in the engine body with the low compression ratio reduces the increase of the heat release rate in the main combustion as a result of the main injection and reduces a combustion noise. On the other hand, within the range where the engine load is relatively high, because the ignitability is improved as a result of the increases in the turbocharging amount and the fuel injection amount, the pre-combustion with the appropriate heat release rate is generated at the predetermined timing before the top dead center in the compression stroke and the ignition delay of the fuel that is injected by the main injection can be shortened even when the injection ratio for the pre-stage injections is reduced in the second injection mode. That is, the combustion noise does not become louder.

The first injection mode may include a plurality of pre-stage injections, and the second injection mode may include a lesser number of pre-stage injections than in the first injection mode.

As described above, the plurality of pre-stage injections causes the pre-combustion with the appropriate heat release rate at the predetermined timing before the top dead center in the compression stroke and benefits in shortening the ignition delay of the fuel injected by the main injection.

The predetermined operating range may be a relatively high rotation speed range within a low rotation speed range when the operating range of the engine body is divided into the low rotation speed range and a high rotation speed range.

The predetermined operating range may be restated as the range with the engine speed higher than an engine idling speed by over a predetermined value and the range is performed with the turbocharging for over a predetermined amount. That is, the above described switching between the first and second injection modes may be performed within the range where the turbocharging is performed for over the predetermined amount.

In the first injection mode, the injection control module may perform the post-stage injection at a timing in which at least a part of the injected fuel reaches within the cavity, and, in the second injection mode, the injection control module may perform the post-stage injection twice at the timing in which at least the part of the injected fuel reaches within the cavity and the timing in which the injected fuel reaches outside the cavity of the piston.

As the post-stage injection, performing the fuel injection at the timing in which at least the part of the injected fuel reaches within the cavity means that the fuel injection is performed at a comparatively early timing after the main injection. Therefore, injecting the fuel at the above timing promotes the main combustion and shortens an afterburn time period because the fuel is additionally injected during the main combustion. As a result, the injecting the fuel at the above timing reduces an exhaust loss and improves the thermal efficiency, and further benefits in improving the torque and a fuel consumption.

As the post-stage injection, performing the fuel injection at the timing in which the injected fuel reaches outside the cavity of the piston as described above promotes the oxidation of the soot and benefits in reducing the discharge of the soot by utilizing the air outside the cavity while keeping the temperature in the cylinder in the expansion stroke high.

Therefore, within the range where the engine load is relatively low within the predetermined operating range, performing the pre-stage injection for the plurality of times increases the premixture ratio of the fuel and benefits in reducing the generation of the soot, and further performing the post-stage injection once at the earlier timing benefits in improving the torque and the fuel consumption (i.e., the first injection mode). On the other hand, within the range where the engine load is relatively high within the predetermined operating range, reducing the number of the pre-stage injections avoids an excessive pre-stage combustion and benefits in improving the NVH performance, and further performing the post-stage injection twice at the earlier timing and the post-stage timing improves the torque and the fuel consumption and benefits in reducing the discharge of the soot (i.e., the second injection mode). Particularly, although performing the post-stage injection where the fuel is additionally injected during the main combustion is disadvantageous in the generation of the soot because the fuel injection amount is increased within the range where the engine load is relatively high, by combining with the post-stage injection performed at the post-stage timing, the discharge of the soot can be reduced as much as possible.

The timing of performing the main injection may be earlier in the second injection mode than in the first injection mode.

When the engine body is under the relatively high load state, setting the timing for the main injection earlier is beneficial in improving the torque. On the other hand, the setting the timing for the main injection earlier shortens the ignition delay and is disadvantageous in suppressing the generation of the soot; however, by performing the post-stage injection after the main injection in the second injection mode, the discharge of the soot can be reduced as much as possible.

Within an operating range where the load is higher compared to the predetermined operating range, the EGR amount control module may stop introducing the EGR gas into the cylinder and the injection control module may reduce the injection ratio for the pre-stage injection to be lower than in the second injection mode.

Within the range where the load is higher than within the operating range, the amount of the new air inside the cylinder is increased due to combination of the turbocharging amount by the turbocharger being increased and the introduction of the EGR gas being stopped. The increase of the amount of the new air is beneficial in generating a high torque. Further, within the operating range, the temperature and pressure inside the cylinder at near the top dead center in the compression stroke increases and the ignitability of the fuel improves. Therefore, the pre-combustion with large power is not required, and the injection ratio for the pre-stage injection can be reduced to be less than in the second injection mode.

Within the operating range where the load is higher compared to the predetermined operating range, the injection control module may reduce the number of the pre-stage injections to be less than in the second injection mode. Alternately, the injection ratio for the main injection may be reduced by reducing the number of the injections.

According to another aspect of the invention, a method of controlling an automobile-mount diesel engine with a turbocharger, in which the engine is supplied with fuel containing diesel fuel as its main component is provided.

The method includes switching to, when the engine is within a range where a load is relatively low within a predetermined operating range where a rotation speed is low and the load is partial, a first injection mode that includes introducing EGR gas into a cylinder of the engine, performing a main injection where the fuel is injected at or near a top dead center in a compression stroke to cause a main combustion that mainly includes a diffusion combustion, and performing a pre-stage injection where the fuel is injected prior to the main injection according to a predetermined injection ratio with respect to a fuel injection amount of the main injection, switching to, when the engine is within a range where the load is relatively high within the predetermined operating range, a second injection mode that includes introducing the EGR gas into the cylinder of the engine and performing the main injection, the pre-stage injection with an injection ratio lower than in the first injection mode, and a post-stage injection where the fuel is injected after the main injection to extend the main combustion, and performing the post-stage injection partially at a timing in which the injected fuel reaches outside a cavity formed in a top surface of a piston.

BRIEF DESCRIPTION OF THE DRAWINGS

FIG. 10 is charts, in which a part (a) is a chart showing an example of the fuel injection mode within the operating range G in the map of FIG. 3 and the part (b) is a chart showing an example of a history of a heat release rate corresponding to the fuel injection mode within the operating range G.

FIG. 11 is charts, in which a part (a) is a chart showing an example of the fuel injection mode within the operating range H in the map of FIG. 3 and the part (b) is a chart showing an example of a history of a heat release rate corresponding to the fuel injection mode within the operating range H.

DESCRIPTION OF EMBODIMENTS

Figure 1:
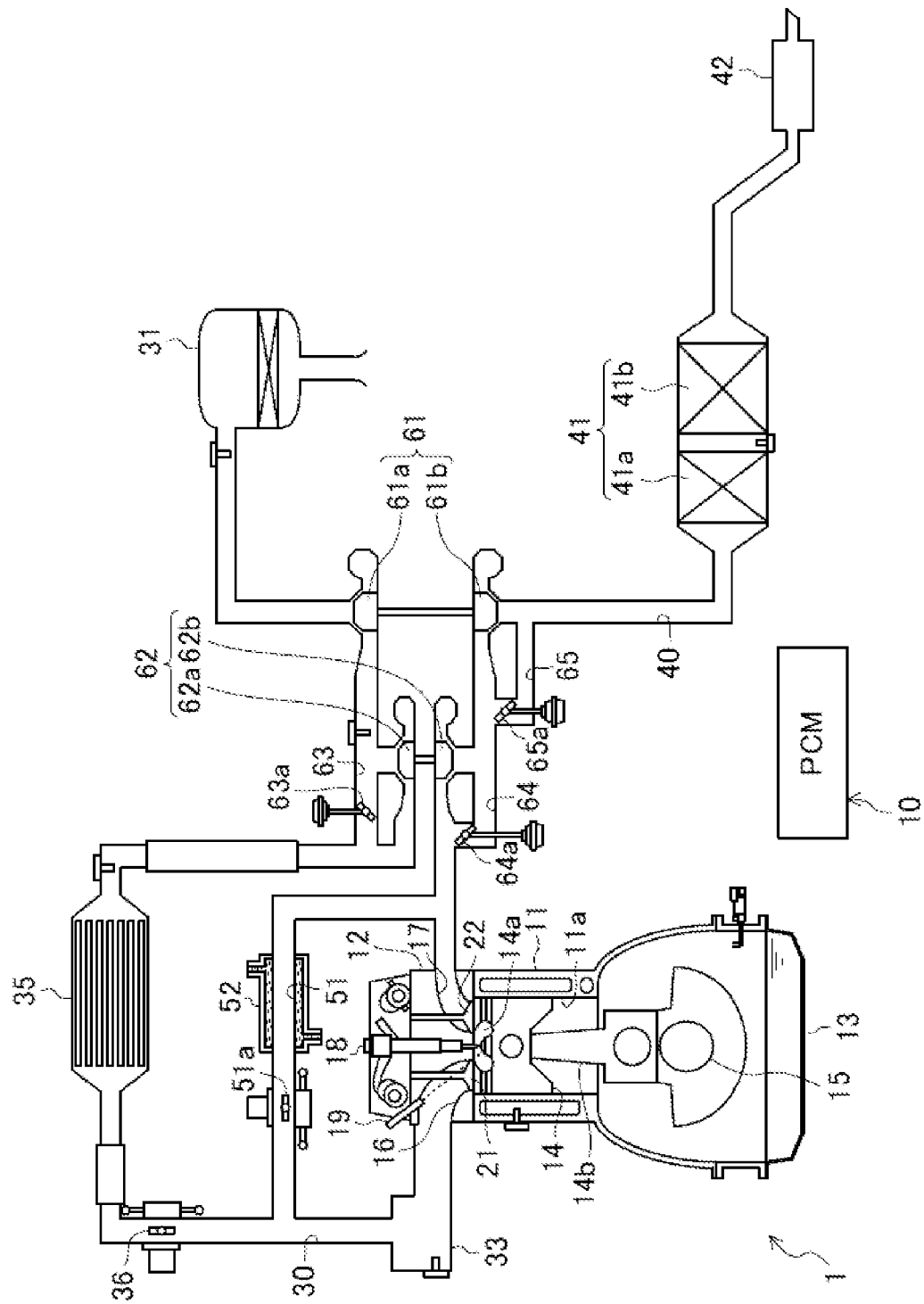
FIG. 1 is a schematic diagram showing a configuration of a diesel engine according to an embodiment.
Figure 2:
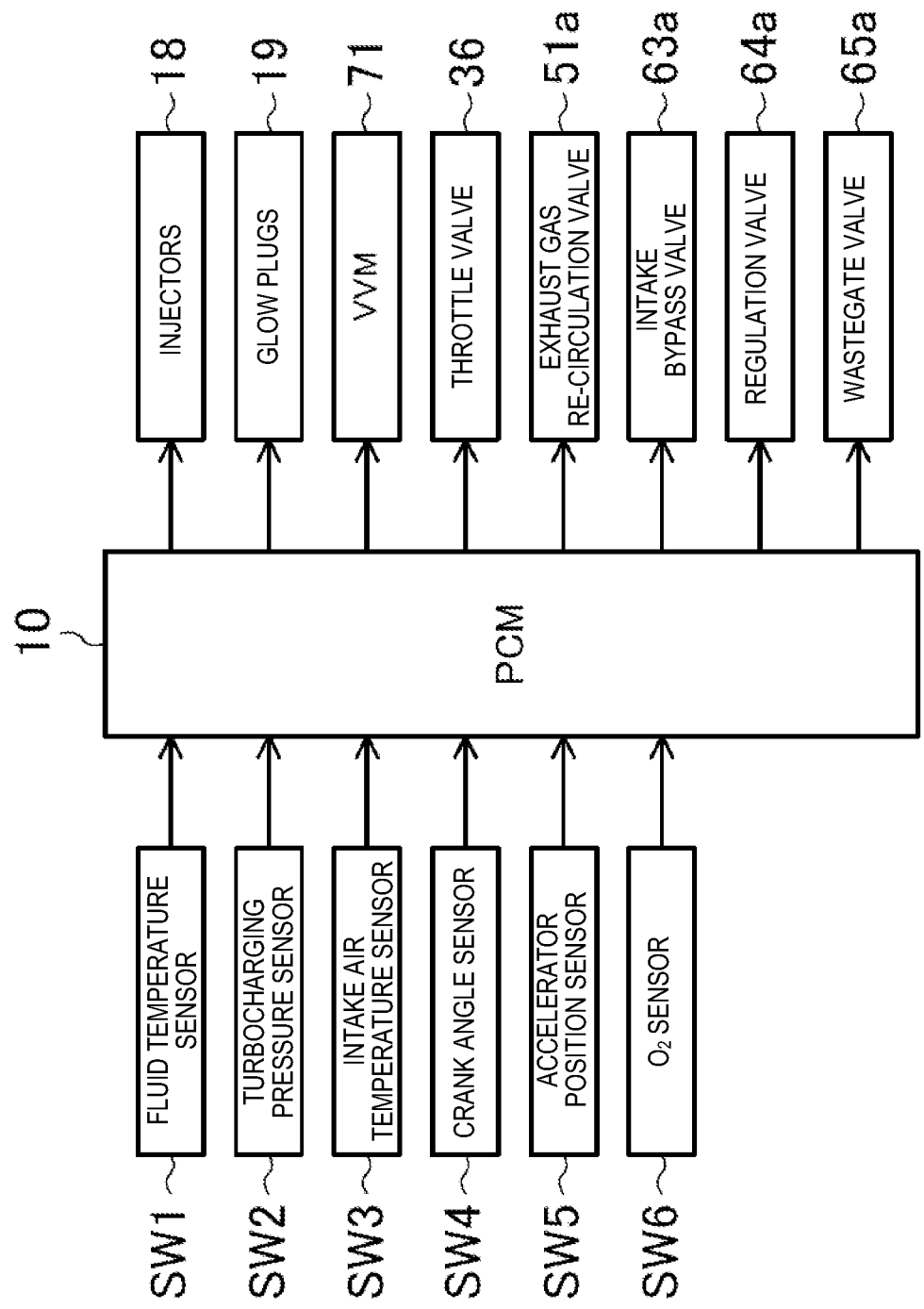
FIG. 2 is a block diagram relating to a control of the diesel engine.

Hereinafter, a diesel engine according to an embodiment of the present invention is described in detail with reference to the appended drawings. Note that, the following description of the preferred embodiment is merely an illustration. FIGS. 1 and 2 show schematic configurations of an engine (engine body) 1 of the embodiment. The engine 1 is a diesel engine that is mounted in a vehicle and supplied with fuel in which a main component is diesel fuel. The diesel engine includes a cylinder block 11 provided with a plurality of cylinders 11a (only one cylinder is illustrated), a cylinder head 12 arranged on the cylinder block 11, and an oil pan 13 arranged below the cylinder block 11 and where a lubricant is stored. Inside the cylinders 11a of the engine 1, pistons 14 are reciprocatably inserted, and cavities partially forming reentrant combustion chambers 14a are formed in top surfaces of the pistons 14, respectively. Each of the pistons 14 is coupled to a crank shaft 15 via a connecting rod 14b.

In the cylinder head 12, an intake port 16 and an exhaust port 17 are formed and an intake valve 21 for opening and closing the opening of the intake port 16 on the combustion chamber 14a side and an exhaust valve 22 for opening and closing the opening of the exhaust port 17 on the combustion chamber 14a side are arranged for each of the cylinders 11a.

Within a valve system of the engine 1 for operating the intake and exhaust valves 21 and 22, a hydraulically-actuated switching mechanism 71 (see FIG. 2, hereinafter, it is referred to as VVM, variable valve motion) for switching an operation mode of the exhaust valves 22 between a normal mode and a special mode is provided on the exhaust valve side. The VVM 71 (a detailed configuration is not illustrated) includes two kinds of cams with cam profiles different from each other, that is a first cam having one cam nose and a second cam having two cam noses, and a lost motion mechanism for selectively transmitting an operating state of either one of the first and second cams to the exhaust valves 22. When the lost motion mechanism transmits the operating state of the first cam to the exhaust valves 22, the exhaust valves 22 operate in the normal mode and open only once during an exhaust stroke. On the other hand, when the lost motion mechanism transmits the operating state of the second cam to the exhaust valves 22, the exhaust valves 22 operate in the special mode and open during the exhaust stroke and further during an intake stroke once each, that is the exhaust valves are opened twice.

The mode switching in the VVM 71 between the normal and special modes is performed by a hydraulic pressure applied by a hydraulic pump (not illustrated) operated by the engine. The special mode may be utilized for a control related to an internal EGR. Note that, an electromagnetically-operated valve system for operating the exhaust valve 22 by using an electromagnetic actuator may be adopted for switching between the normal and special modes. Further, the execution of the internal EGR is not limited to opening the exhaust valves 22 twice, and it may be accomplished through an internal EGR control by opening the intake valves 21 twice or through an internal EGR control where having the burnt gas to remain in the combustion chambers by setting a negative overlap period through closing both of the intake and exhaust valves 21 and 22 during the exhaust stroke or the intake stroke. Note that, the internal EGR control is controlled by the VVM 71 mainly under a cold state of the engine 1 where ignitability of the fuel is low.

Injectors 18 for injecting the fuel and glow plugs 19 for improving the ignitability of the fuel by heating intake air in the cylinders 11a when the engine 1 is under the cold state are provided within the cylinder head 12. The injectors 18 are arranged so that fuel injection ports thereof face the combustion chambers 14a from ceiling surfaces of the combustion chambers 14a, respectively, and the injectors 18 supply the fuel to the combustion chambers 14a by directly injecting the fuel mainly near a top dead center (TDC) in a compression stroke.

An intake passage 30 is connected to a side surface of the engine 1 so as to communicate with the intake ports 16 of the cylinders 11a. Meanwhile, an exhaust passage 40 for discharging the burnt gas (i.e., exhaust gas) from the combustion chambers 14a of the cylinders 11a is connected to the other side surface of the engine 1. A large turbocharger and a compact turbocharger 62 for turbocharging the intake air (described in detail below) are arranged in the intake and exhaust passages 30 and 40.

An air cleaner 31 for filtrating the intake air is arranged in an upstream end part of the intake passage 30. A surge tank 33 is arranged near a downstream end of the intake passage 30. A part of the intake passage 30 on the downstream side of the surge tank 33 is branched to be independent passages extending toward the respective cylinders 11a, and downstream ends of the independent passages are connected with the intake ports 16 of the cylinders 11a.

A compressor 61a of the large turbocharger 61, a compressor 62a of the compact turbocharger 62, an intercooler 35 for cooling air compressed by the compressors 61a and 62a, and a throttle valve 36 for adjusting an amount of the intake air flowing into the combustion chambers 14a of the cylinders 11a are arranged in the intake passage 30 between the air cleaner 31 and the surge tank 33. The throttle valve 36 is basically fully opened; however, it is fully closed when the engine 1 is stopped so as to prevent a shock.

A part of the exhaust passage 40 on the upstream side is constituted with an exhaust manifold having independent passages branched toward the cylinders 11a and connected with outer ends of the exhaust ports 17 and a merging part where the independent passages merge together.

In a part of the exhaust passage 40 on the downstream of the exhaust manifold, a turbine 62b of the compact turbocharger 62, a turbine 61b of the large turbocharger 61, an exhaust emission control device 41 for purifying hazardous components contained in the exhaust gas, and a silencer 42 are arranged in this order from the upstream.

The exhaust emission control device 41 includes an oxidation catalyst 41a and a diesel particulate filter 41b (hereinafter, referred to as the filter), and these components are arranged in this order from the upstream. The oxidation catalyst 41a and the filter 41b are accommodated in a case. The oxidation catalyst 41a has an oxidation catalyst carrying, for example, platinum or platinum added with palladium and promotes a reaction generating $CO_2$ and $H_2O$ by oxidizing CO and HC contained in the exhaust gas. The filter 41b catches particulates such as soot contained in the exhaust gas from the engine 1. Note that the filter 41b may be coated with the oxidation catalyst.

A part of the intake passage 30 between the surge tank 33 and the throttle valve 36 (i.e., a part downstream of the compact compressor 62a of the compact turbocharger 62) and a part of the exhaust passage 40 between the exhaust manifold and the compact turbine 62b of the compact turbocharger 62 (i.e., a part upstream of the compact turbine 62b of the compact turbocharger 62) are connected with an exhaust gas re-circulation passage 51 for partially re-circulating the exhaust gas to the intake passage 30. An exhaust gas re-circulation valve 51a for adjusting a re-circulation amount of the exhaust gas to the intake passage 30, and an EGR cooler 52 for cooling the exhaust gas by an engine coolant are arranged in the exhaust gas re-circulation passage 51.

The large turbocharger 61 has the large compressor 61a arranged in the intake passage 30 and the large turbine 61b arranged in the exhaust passage 40. The large compressor 61a is arranged in the intake passage 30 between the air cleaner 31 and the intercooler 35. The large turbine 61b is arranged in the exhaust passage 40 between the exhaust manifold and the oxidation catalyst 41a.

The compact turbocharger 62 has the compact compressor 62a arranged in the intake passage 30 and the compact turbine 62b arranged in the exhaust passage 40. The compact compressor 62a is arranged in the intake passage 30 downstream of the large compressor 61a. The compact turbine 62b is arranged in the exhaust passage 40 upstream of the large turbine 61b.

That is, the large compressor 61a and the compact compressor 62a are arranged in series in the intake passage 30 in this order from the upstream, and the compact turbine 62b and the large turbine 61b are arranged in series in the exhaust passage 40 in this order from the upstream. The large and compact turbines 61b and 62b are rotated by the flow of the exhaust gas, and the large and compact compressors 61a and 62a coupled with the large and compact turbines 61b and 62b are actuated by the rotations of the large and compact turbines 61b and 62b, respectively.

The compact turbocharger 62 is smaller and the large turbocharger 61 is larger in relation to each other. That is, inertia of the large turbine 61b of the large turbocharger 61 is larger than that of the compact turbine 62b of the compact turbocharger 62.

A small intake bypass passage 63 for bypassing the small compressor 62a is connected with the intake passage 30. A small intake bypass valve 63a for adjusting an amount of the air flowing into the small intake bypass passage 63 is arranged in the small intake bypass passage 63. The small intake bypass valve 63a is fully closed (normally closed) when no electric power is distributed thereto.

A small exhaust bypass passage 64 for bypassing the small turbine 62b and a large exhaust bypass passage 65 for bypassing the large turbine 61b are connected with the exhaust passage 40. A regulation valve 64a for adjusting an amount of the exhaust gas flowing to the small exhaust bypass passage 64 is arranged in the small exhaust bypass passage 64, and a wastegate valve 65a for adjusting an exhaust gas amount flowing to the large exhaust bypass passage 65 is arranged in the large exhaust bypass passage 65. The regulation valve 64a and the wastegate 65a are both fully opened (normally opened) when no electric power is distributed thereto.

The diesel engine 1 with the configuration described as above is controlled by a powertrain control module 10 (herein after, may be referred to as PCM). The PCM 10 is configured by a CPU, a memory, a counter timer group, an interface, and a microprocessor with paths for connecting these units. The PCM 10 configures a control device. As shown in FIG. 2, the PCM 10 is inputted with detection signals from a fluid temperature sensor SW1 for detecting a temperature of the engine coolant, a turbocharging pressure sensor SW2 attached to the surge tank 33 and for detecting a pressure on the air to be supplied to the combustion chambers 14a, an intake air temperature sensor SW3 for detecting a temperature of the intake air, a crank angle sensor SW4 for detecting a rotational angle of the crank shaft 15, an accelerator position sensor SW5 for detecting an accelerator opening amount corresponding to an angle of an acceleration pedal (not illustrated) of the vehicle, and an $O_2$ sensor SW6 for detecting an oxygen concentration within the exhaust gas. The PCM 10 performs various kinds of calculations based on the detection signals so as to determine the states of the engine 1 and the vehicle, and further outputs control signals to the injectors 18, the glow plugs 19, the VVM 71 of the valve system, and the actuators of the valves 36, 51a, 63a, 64a and 65a according to the determined states.

Thus, the engine 1 is configured to have a comparatively low compression ratio in which its geometric compression ratio is within a range of 12:1 to below 15:1, and thereby, the exhaust emission performance and a thermal efficiency are improved. The large and small turbochargers 61 and 62 increase a torque of the engine 1 so as to compensate for the power that is lost by the lowered geometric compression ratio.

(Description of Combustion Control of the Engine)

In the basic control of the engine 1 by the PCM 10, a target torque (i.e., target load) is determined mainly based on the accelerator opening amount, and an injection amount and an injection timing of the fuel corresponding to the target torque is realized by controlling the actuations of the injectors 18. Further, a re-circulation ratio of the exhaust gas to the cylinders 11a is controlled by controlling the opening angles of the throttle valve 36 and the exhaust gas re-circulation valve 51a (i.e., external EGR control) and controlling the VVM 71 (i.e., internal EGR control).

Figure 3:
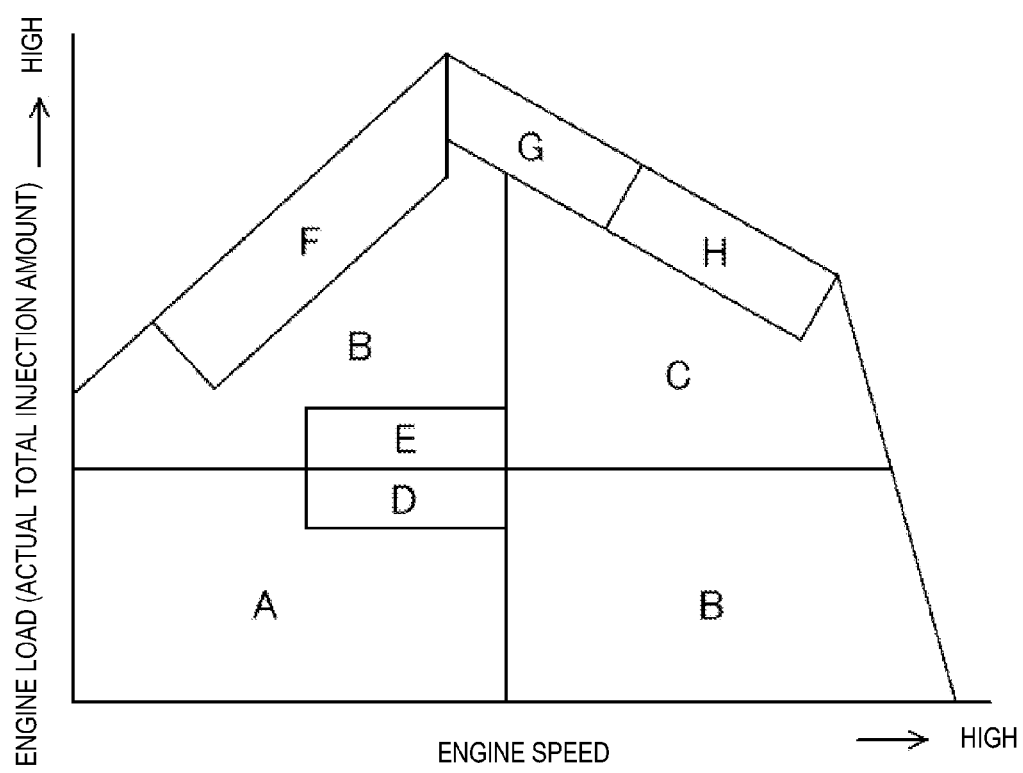
FIG. 3 is an example of a map showing fuel injection modes of injectors according to a condition of the diesel engine.

FIG. 3 is a map showing fuel injection modes of the injectors 18 according to the condition of the engine under a warmed-up state. As shown in FIG. 3, when the engine 1 is under the warmed-up state, nine operating ranges A to H (two operating ranges B exist therein) are set according to an engine speed and an engine load (i.e., an actual total injection amount) and combustion modes are set for the respective operating ranges.

Here, within the ranges A, D and E where the engine load and low engine speed are relatively low as shown in FIG. 3, a comparatively large amount of external EGR gas is introduced into the cylinders 11a by the control of the opening angles of the exhaust gas re-circulation valve 51a and the throttle valve 36 so that the exhaust emission performance (i.e., reduction of NOx) is improved. Thus, the ignitability of the fuel is low in the cylinders 11a particularly within these operating ranges due to the introduction of the large amount of the external EGR gas together with the above described low compression ratio of the engine 1.

Hereinafter, the fuel injection modes within operating ranges are described in detail with reference to FIGS. 4 to 11. Note that, when FIGS. 4 to 11 are compared to each other, the fuel injection amounts and the heat release rates therein do not necessarily indicate the relative differences thereamong.

Figure 4A:
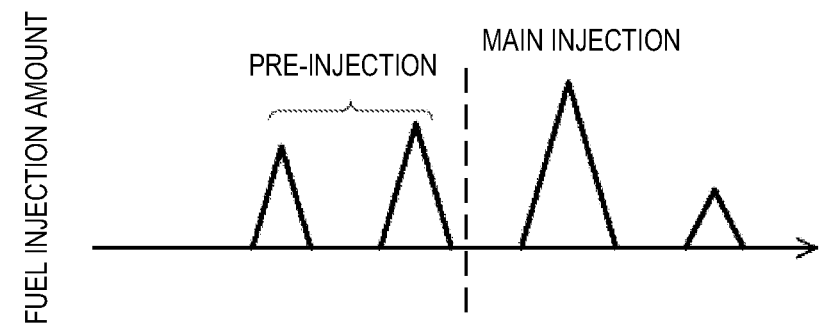
FIG. 4 is charts, in which a part (a) is a chart showing an example of the fuel injection mode within the operating range A in the map of FIG. 3 and the part (b) is a chart showing an example of a history of a heat release rate corresponding to the fuel injection mode within the operating range A.
Figure 4B:
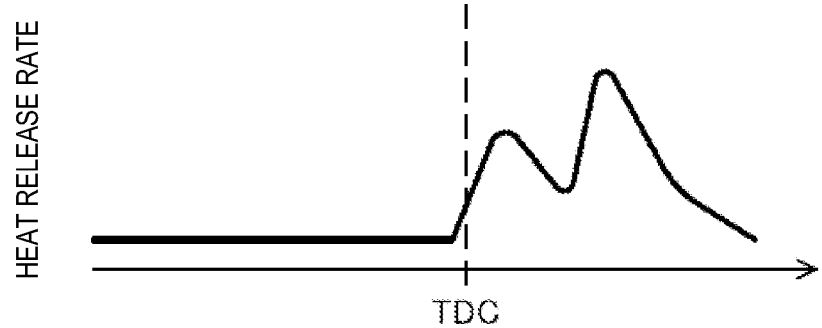

In FIG. 4, the part (a) is a chart showing the fuel injection mode within the operating range A and the part (b) is a chart showing an example of a history of the heat release rate in the cylinders 11a corresponding to the fuel injection mode within the operating range A. The operating range A is an operating range, where the engine speed is low and the engine load is low, including an idle range. In the fuel injection mode within the range A, a fuel injection with comparatively large injection amount (i.e., pre-injection) is performed twice during a compression stroke before the top dead center with a predetermined time interval therebetween, a main injection with a comparatively short pulse width is performed after the TDC in the compression stroke, and, then, a fuel injection is performed once again. That is, the total of four fuel injections are performed within the operating range A.

Figure 5A:
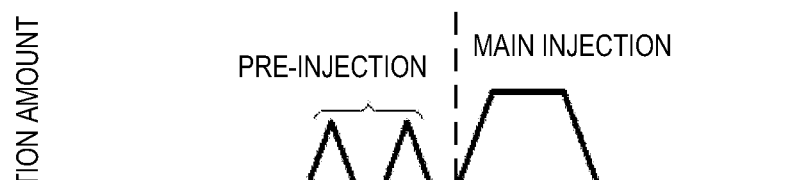
FIG. 5 is charts, in which a part (a) is a chart showing an example of the fuel injection mode within the operating range B in the map of FIG. 3 and the part (b) is a chart showing an example of a history of a heat release rate corresponding to the fuel injection mode within the operating range B.
Figure 5B:
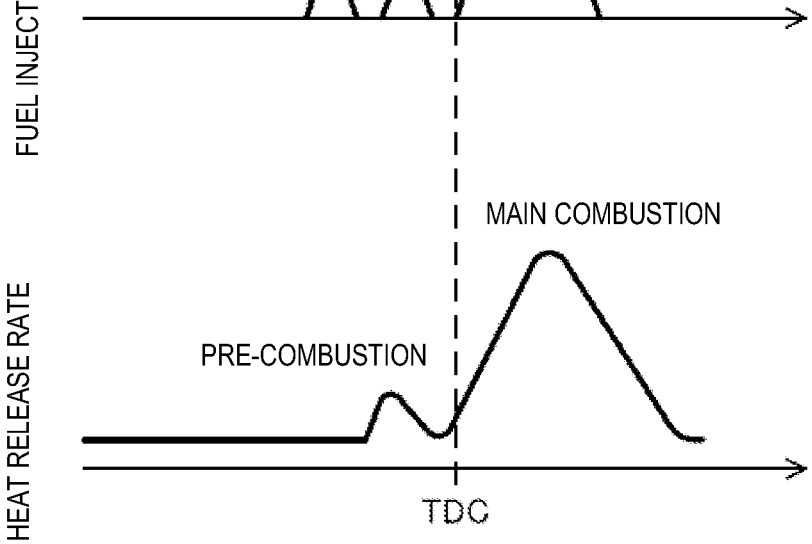

In FIG. 5, the part (a) is a chart showing the fuel injection mode within the operating range B and the part (b) is a chart showing an example of a history of the heat release rate in the cylinders 11*a* corresponding to the fuel injection mode within the operating range B. The operating range B is a range where the engine speed or the engine load is higher relative to the operating range A. Within the operating range B, the fuel injection (i.e., the pre-injection) is performed twice during the compression stroke at timings before and comparatively close to the TDC with a comparatively short time interval and, then, the main injection is performed once at near the TDC in the compression stroke. That is, the total of three fuel injections are performed within the operating range B. The two pre-injections cause a pre-combustion (i.e., the pre-stage combustion) with a sufficient heat release rate at a predetermined timing before the TDC in the compression stroke, and thereby, a stability of the following main combustion improves and an increase of a heat release rate in the main combustion is subsided. Avoiding the rapid increase of the heat release rate is beneficial in reducing a combustion noise and improving an NVH performance.

Figure 6:
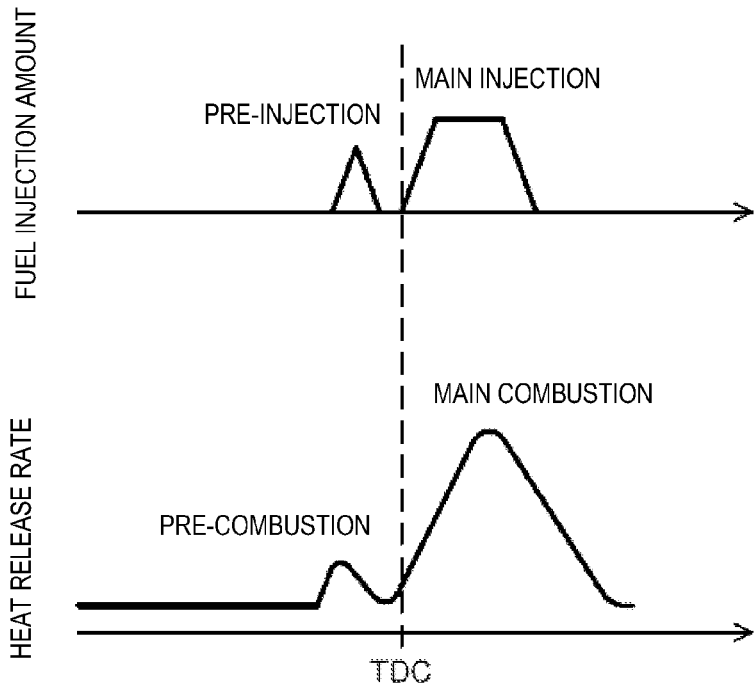
FIG. 6 is charts, in which a part (a) is a chart showing an example of the fuel injection mode within the operating range C in the map of FIG. 3 and the part (b) is a chart showing an example of a history of a heat release rate corresponding to the fuel injection mode within the operating range C.
Figure 6:
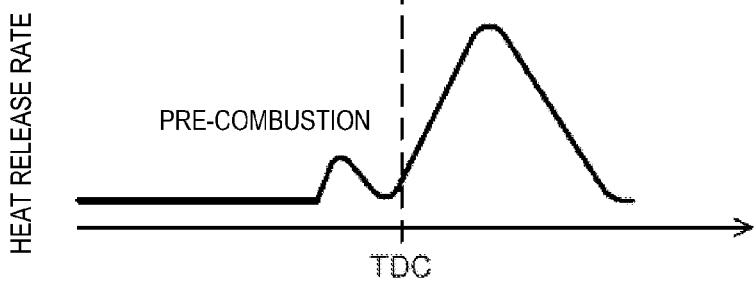

In FIG. 6, the part (a) is a chart showing the fuel injection mode within the operating range C and the part (b) is a chart showing an example of a history of the heat release rate in the cylinders 11*a* corresponding to the fuel injection mode within the operating range C. The operating range C is a range where the engine speed and the engine load are higher relative to the operating range B. Within the operating range C, the fuel injection (i.e., the pre-injection) is performed once during the compression stroke and, then, the main injection is performed at near the TDC in the compression stroke, that is the total of two fuel injections are performed. Within the operating range C, the engine speed and load are high, a sufficient turbocharging amount can be obtained, and the fuel injection amount is increased, compared to the operating range B. Therefore, within the operating range C, the temperatures in the cylinders are raised and the ignitability of the fuel is improved compared to the operating range B, and therefore, even when the number of the pre-injections is reduced, the pre-combustion with the sufficient heat release rate can be caused at a predetermined timing before the TDC in the compression stroke similar to that within the operating range B. That is, the pre-injections are set, specifically the number of the pre-injections is adjusted, within the operating ranges B and C so that levels (i.e., heat release rate) and positions of peaks of the pre-combustions thereof in FIGS. 5 and 6 are at substantially the same position. As a result, the stability of the main combustion benefits and the rapid increase of the heat release rate by the main combustion can be avoided so as to improve the NVH performance within the operating range C.

Thus, the number of the fuel injections is set to decrease as the rotation speed of the engine 1 becomes higher or the load on the engine 1 becomes higher, that is the number of the fuel injections is less in the operating range B than the operating range A, and further less in the operating range C than the operating range B. The number of the fuel injections can be set less while achieving the desired combustion mode because the fuel injection amount is increased as the rotation speed or the load of the engine 1 become higher and become beneficial in igniting the fuel, and on the other hand, reducing the number of the fuel injections can contribute to improving robustness by raising the fuel injection accuracy.

Figure 7:
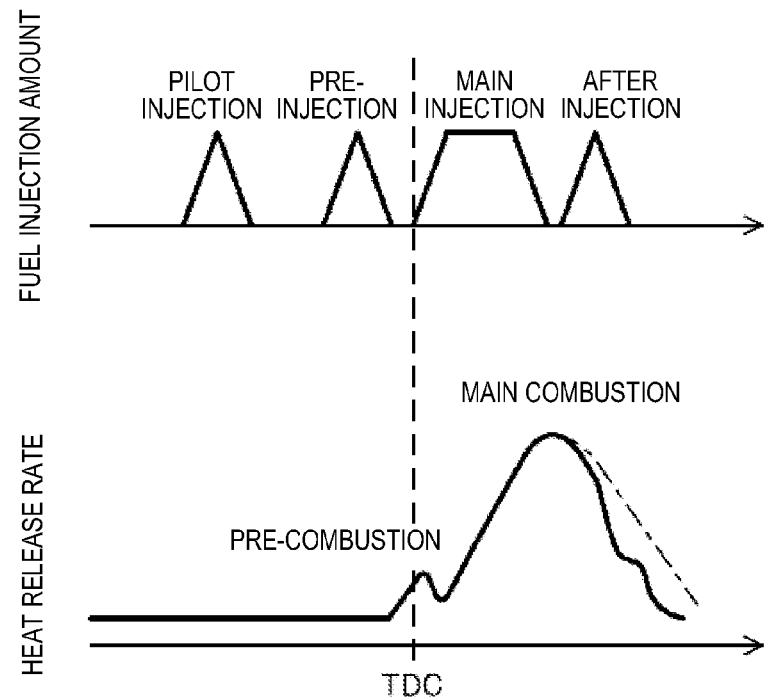
FIG. 7 is charts, in which a part (a) is a chart showing an example of the fuel injection mode within the operating range D in the map of FIG. 3 and the part (b) is a chart showing an example of a history of a heat release rate corresponding to the fuel injection mode within the operating range D.
Figure 7:
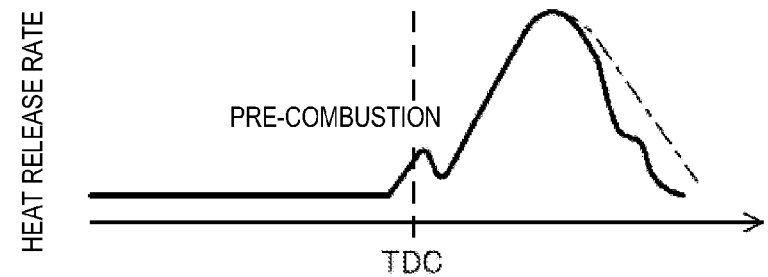

In FIG. 7, the part (a) is a chart showing the fuel injection mode within the operating range D and the part (b) is a chart showing an example of a history of the heat release rate in the cylinders 11*a* corresponding to the fuel injection mode within the operating range D. The operating range D is the relatively high engine speed range within a range where the engine speed is low when divided into the low engine speed range and the high engine speed range. Although the operating range D is merely an example and not limited to this, it corresponds to an engine speed range of about, for example, 1600 to 2200 rpm. Further, the operating range D is within the range with a partial load (specifically, middle load). The fuel injection is performed twice during the compression stroke within the operating range D. The first fuel injection between the two injections is a pilot injection that is performed at a timing relatively far from the TDC in the compression stroke, in other words at a comparatively early timing. On the other hand, the second injection is the pre-injection that is performed at a timing comparatively close to the TDC in the compression stroke. The pilot injection is beneficial in suppressing the generation of the soot by improving a premixture level of the fuel. That is, as described above, within the operating range D, the large amount of the external EGR gas is introduced and, because the range D is under the low engine load compared to the operating range E (described below), the turbocharging amount is small, and thereby, it is disadvantageous regarding suppressing the generation of the soot. Therefore, the generation of the soot can effectively be suppressed by performing the pilot injection.

Further as described above, the large amount of the external EGR gas is introduced and the turbocharging amount is small within the operating range D in addition to the geometric compression ratio of the engine 1 being set low, thereby, the ignitability of the fuel in the cylinders 11*a* is low within the range D. Therefore, the combination of the pilot injection and the pre-injection as the pre-stage injections can cause the sufficient pre-combustion prior to the main combustion, shorten an ignition delay of the fuel injected by the main injection at near the TDC in the compression stroke, and suppress the rapid increase of the heat release rate, and thereby, the combination can contribute to improving the NVH performance.

Further, a post-stage injection (i.e., an after injection) is performed once after the main injection within the operating range D. The after injection is performed during the main combustion, in other words it is performed while the heat is being released by the main combustion, and at least a part of the fuel injected by the after injection reaches within the cavities in the pistons 14 that are descending after the TDC in the compression stroke. Preferably, the majority of the fuel injected by the after injection reaches within the cavities. The after injection promotes the main combustion and shortens an afterburn time period. That is, in the part (b) of FIG. 7, the waveform indicated by the solid line is an example of a waveform when the after injection is performed and the waveform indicated by the dashed line is an example of a waveform when the after injection is not performed. The after injection does not affect the rising waveform of the main combustion and can shorten the combusting time period. Thus, it is beneficial in improving a torque and, as a result, contributes to improving a fuel consumption.

Figure 8:
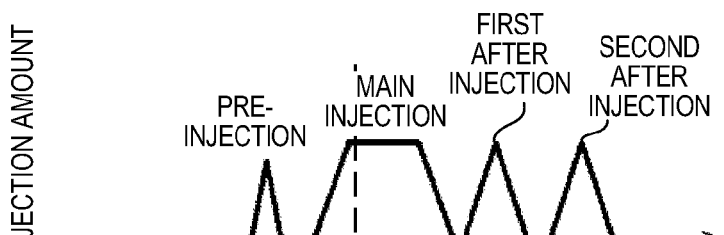
FIG. 8 is charts, in which a part (a) is a chart showing an example of the fuel injection mode within the operating range E in the map of FIG. 3 and the part (b) is a chart showing an example of a history of a heat release rate corresponding to the fuel injection mode within the operating range E.
Figure 8:
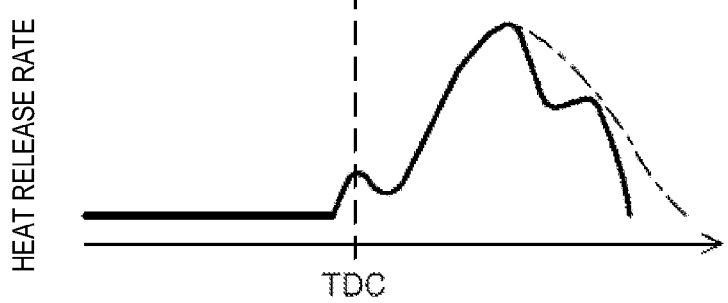

In FIG. 8, the part (a) is a chart showing the fuel injection mode within the operating range E and the part (b) is a chart showing an example of a history of the heat release rate in the cylinders 11*a* corresponding to the fuel injection mode within the operating range E. The operating range E is the relatively high load range from and adjacent to the operating range D in FIG. 3. Therefore, the operating range E is the relatively high engine speed range within a range where the engine speed is low when the engine speed is divided into the low engine speed range and the high engine speed range, and the range E corresponds to the range where the load is partial (specifically, the middle load). The pre-injection is performed once during the compression stroke within the operating range E. Therefore, compared to the operating range D, the pilot injection is omitted and the number of the pre-stage injections is reduced within the operating range E. However, the injection ratio of the injection amount by the pre-stage injection to the injection amount by the main injection within the operating range E is lower than that of the operating range D because the injection amount by the main injection increases as a result of the increase in the engine load. Within the operating range E, the turbocharging amount is increased and the fuel injection amount is relatively large due to the relatively high engine load, and the ignitability is improved with respect to the operating range D. The reduction of the number of the pre-stage injections avoids in advance the excessive increase of the heat release rate in the pre-combustion due to the excessive pre-stage injections and is beneficial in avoiding the degradation of the NVH performance. That is, the excessive pre-stage injections cause the pre-combustion with a high heat release rate peak. Thus, the high peak of the pre-combustion and the peak of the main combustion are generated, and thereby, it is disadvantageous particularly in view of the combustion noise with a low frequency. As described above, omitting the pilot injection within the operating range E suppresses the peak of the pre-combustion and improves the NVH performance.

Further, the after injection is performed twice, that is the first after injection and the second after injection, after the main injection within the operating range E. The first after injection is performed at a relatively early timing after the main injection and, similar to the after injection within the operating range D, at least a part of the fuel injected by the first after injection reaches within the cavities in the pistons 14 that are descending after the TDC in the compression stroke. Preferably, the majority of the fuel injected by the first after injection reaches within the cavities. Thus, as described above, the first after injection promotes the main combustion and shortens the combusting time period (see the dashed line in the part (b) of FIG. 8).

The second after injection is performed at a relatively late timing after the first after injection. That is, the second after injection is performed at a timing which extends the main combustion (corresponding to a delay limit timing) and a timing in which the injected fuel reaches outside the cavities of the descending pistons 14 (corresponding to an advance limit timing). The second after injection has a function to extend the main combustion so as to suppress the reduction of the temperatures in the cylinders 11a and keep the temperatures in the cylinders 11a high in an expansion stroke. Thereby, oxidation of the soot is promoted in the latter stage of a combustion stroke.

That is, within the operating range E, while the engine load is higher than the operating range D and the fuel injection amount increases, the soot is easily generated as a result of omitting the pilot injection. Further, as is obvious when FIGS. 7 and 8 are compared that the timing for the main injection is set earlier within the operating range E than the operating range D in view of improving the torque. Thus, it is further disadvantageous regarding suppressing the generation of the soot. In addition, performing the first after injection is also disadvantageous regarding suppressing the generation of the soot because the fuel is additionally injected during the main combustion period.

Figure 12:
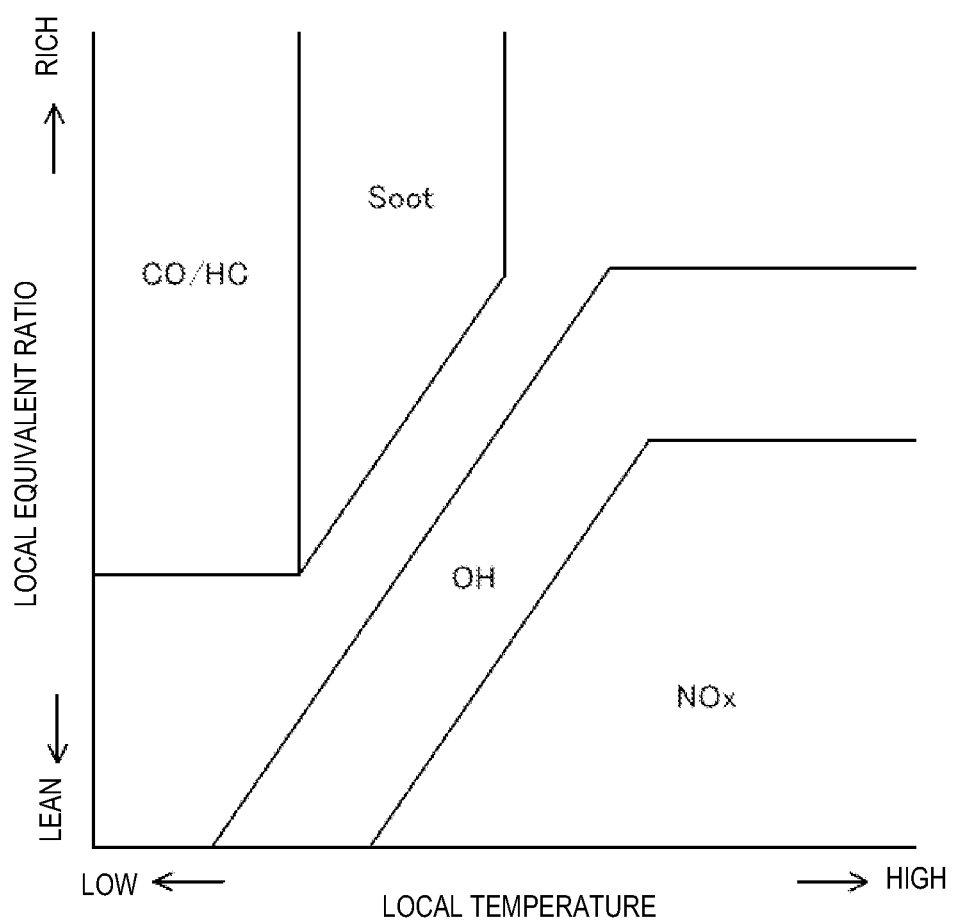
FIG. 12 is an example of a ø-T map.

On the other hand, the second after injection extends the main combustion so as to suppress the reduction of the temperatures in the cylinders 11a and keep the temperatures in the cylinders 11a high in the expansion stroke as described above. In other words, the second after injection extends a time period of remaining in, for example, an OH area of the ø-T map in FIG. 12 in the latter stage of the combustion stroke where the temperatures in the cylinders gradually decrease. Further, because the second after injection is performed at the timing in which the injected fuel reaches outside the cavities of the pistons, a ratio of utilizing the air outside the cavities increases. Therefore, keeping the temperatures in the cylinders 11a high and increasing the utilization ratio of the air outside the cavities are combined to promote the oxidation of the soot in the latter stage of the combustion period. Thus, the discharge of the soot can be suppressed as much as possible within the operating range E where its condition is disadvantageous regarding suppressing the generation of the soot.

Figure 9:
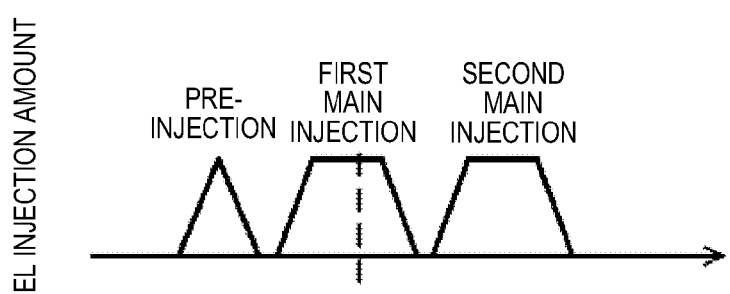
FIG. 9 is charts, in which a part (a) is a chart showing an example of the fuel injection mode within the operating range F in the map of FIG. 3 and the part (b) is a chart showing an example of a history of a heat release rate corresponding to the fuel injection mode within the operating range F.
Figure 9:
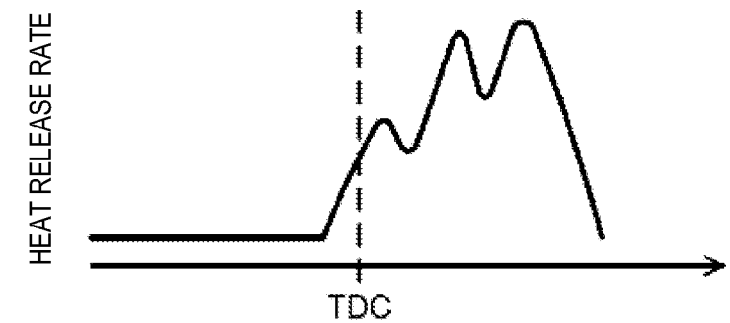

In FIG. 9, the part (a) is a chart showing the fuel injection mode within the operating range F and the part (b) is a chart showing an example of a history of the heat release rate in the cylinders 11a corresponding to the fuel injection mode within the operating range F. The operating range F is the relatively low engine speed range within the high engine load range (including the full engine load). Within the operating range F, the fuel injection (i.e., the pre-injection) is performed once, and the main injection is divided and they are to be performed two separate times. That is, a first main injection at near the TDC in the compression stroke and a following second main injection are performed, and thereby, the total of three fuel injections are performed within the operating range F.

Within the operating range F, although the fuel injection amount increases due to the high engine load, because a combustion pressure excessively increases at the same time in which the rapid increase of the heat release rate occurs when a large amount of fuel is injected by the single main injection, it becomes disadvantageous regarding the combustion noise and, as a result, the NVH performance (particularly the vibration). Particularly, because the engine 1 has the turbochargers and is designed to increase the torque within the high engine load range, the NVH performance easily degrades. Further, because the engine speed is relatively low within the operating range F, the condition also is disadvantageous regarding the NVH performance. Therefore, by dividing the main injection into a plurality of injections (here, two injections), the fuel injection amount per single injection is reduced. By reducing the fuel injection amount per single injection and performing the pre-combustion caused by the pre-injection, the rapid increase of the heat release rate is avoided and the combustion pressure becoming excessively high is suppressed. As a result, there is a beneficial effect in improving the NVH performance. In addition, dividing the main injection extends the main combustion period correspondingly, therefore, it is beneficial in improving the torque. As shown in the part (b) of FIG. 9, the heat release rates by the first and second main injections become continuous and the peaks thereof align contiguously so that the main combustion period is substantially extended. Thereby, securing of the high torque and improvement of the NVH performance are achieved at the same time within the operating range F where the engine load is high and the engine speed is relatively low.

In FIG. 10, the part (a) is a chart showing the fuel injection mode within the operating range G and the part (b) is a chart showing an example of a history of the heat release rate in the cylinders 11a corresponding to the fuel injection mode within the operating range G. The operating range G is the high engine speed range within the higher engine load (including the full engine load) compared to the operating range F. Within the operating range G, the fuel injection (i.e. the pilot injection) is performed once during the compression stroke and the main injection is performed once at near the TDC in the compression stroke, that is the total of two fuel injections are performed.

Because the operating range F has the high engine load and engine speed, the fuel injection amount increases and, thereby, the operating range F is disadvantageous regarding suppressing the generation of the soot. Further, because a turbocharging delay easily occurs within the operating range F during, for example, acceleration, the range F is further disadvantageous regarding suppressing the generation of the soot. Therefore, by performing the pilot injection as the pre-stage injection so that the premixture level of the fuel is improved and becomes beneficial regarding the generation of the soot, and, by limiting the number of the fuel injections to twice (the plot injection and the main injection are performed once each) so that the fuel injection amount by the main injection is sufficiently secured, the high torque can be secured.

Figure 13A:
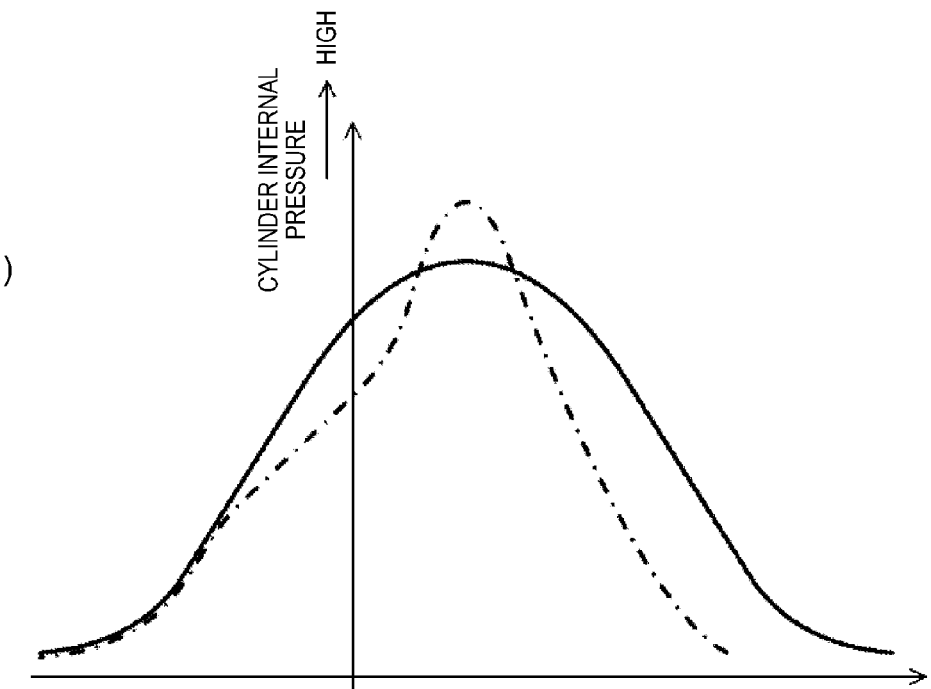
FIG. 13 is views comparing examples of changes in cylinder internal pressures between the operating ranges F and G in the map of FIG. 3.
Figure 13B:
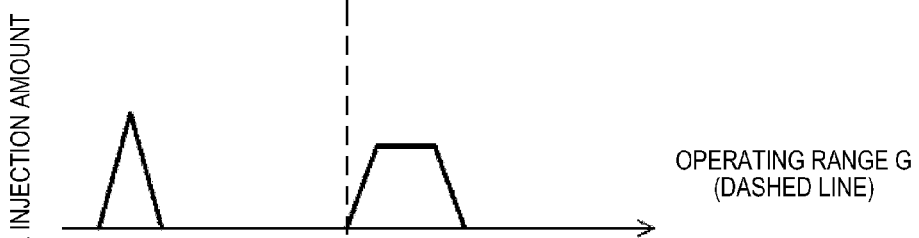
Figure 13C:
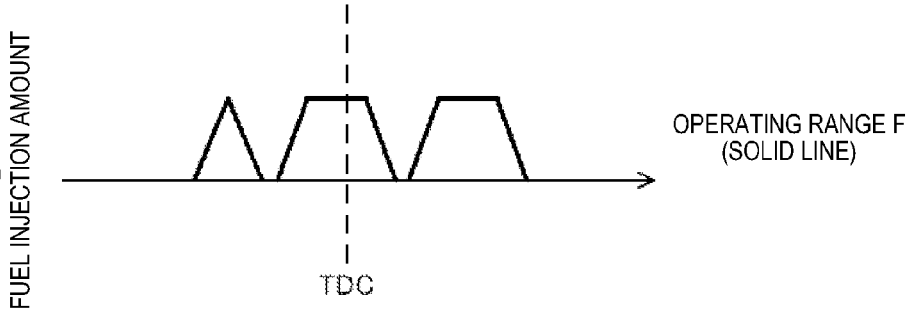

Here, although the operating ranges F and G are within the range where the engine load is high, the engine speeds thereof are different from each other. As described above, the NVH performance is required to be further improved within the operating range F where the engine speed is low. Regarding this point, a description is given as follows with reference to FIG. 13. FIG. 13 is views comparing the change of the cylinder internal pressures between the operating ranges F and G. As described above, the pilot injection and the main injection are performed once each in the fuel injection mode within the operating range G (see the part (b) of FIG. 13), therefore, a comparatively high peak of a cylinder internal pressure is generated at a point after the TDC in the compression stroke as indicated by the dashed line in the part (a) of FIG. 13. The generation of such peak is disadvantageous regarding the NVH performance, particularly the vibration. On the other hand, the pre-injection is performed once and the main injection is divided and they are to be performed two separate times in the fuel injection mode within the operating range F (see the part (c) of FIG. 13), therefore, a clear peak of the cylinder internal pressure is not generated and a significant difference with a motoring waveform does not exist as shown in the part (a) of FIG. 13. Thus, it is particularly beneficial in reducing the vibration of the engine 1 to improve the NVH performance.

In FIG. 11, the part (a) is a chart showing the fuel injection mode within the operating range H and the part (b) is a chart showing an example of a history of the heat release rate in the cylinders 11a corresponding to the fuel injection mode within the operating range H. The operating range H is a range where the engine speed is higher than the operating range G within the high engine load range (including the full engine load). Within the operating range H, the main injection is performed once at near the TDC in the compression stroke. That is, an engine output is increased while particularly improving the robustness so as to secure the highest torque within the operating range H.

Note that, the above described fuel injection modes of the operating ranges are examples, and they are not limited to these. For example, the number of the pre-stage injections, the number of the post-stage injections, and the number of the main injections may be changed within an appropriate range.

Thus, between the operating range D and the operating range E where the comparatively large amount of the EGR gas is introduced into the cylinders 11a, by performing the pre-stage injection twice (the pilot injection and the pre-injection) within the operating range D where the engine load is relatively low, the premixture level of the fuel is improved and benefits in suppressing the generation of the soot.

On the other hand, by omitting the pilot injection within the operating range E where the engine load is relatively high, the excessive pre-stage injection and the excessive pre-combustion caused thereby are avoided to improve the NVH performance. Although the soot may be easily generated within the operating range E because the amount of the fuel that is injected by the main injection increases and the amount of the fuel that is injected by the pre-stage injection is reduced corresponding to the increase in the engine load, by performing the post-stage injection (i.e., the second after injection) at the timing which extends the main combustion and the timing in which the injected fuel reaches outside the cavities formed on the top surfaces of the pistons 14, the oxidation of the soot in the latter stage of the combustion stroke is promoted and the discharge of the soot can be suppressed as much as possible.

As described above, because the geometric compression ratio of the engine 1 is set comparatively low and the operating ranges D and E are, so to say, the regular operating ranges, the NVH performance is important within the ranges D and E. Within the operating range D, performing the two pre-stage injections (the pilot injection and the pre-injection) causes the pre-combustion with the appropriate heat release rate at the predetermined timing before the TDC in the compression stroke, and therefore, it is beneficial in shortening the ignition delay of the fuel that is injected by the main injection. Thus, the increase of the heat release rate by the main combustion caused by the main injection is reduced and improves the NVH performance. Within the operating range E where the engine load is relatively high, because the ignitability is improved as the result of the increases in the turbocharging amount and the fuel injection amount, the pre-combustion with the appropriate heat release rate is caused at the predetermined timing before the TDC in the compression stroke and the ignition delay of the fuel that is injected by the main injection can be shortened even when the number of the pre-stage injections is reduced. That is, the NVH performance does not degrade.

Further, within the operating ranges D and E, by performing the fuel injection as the post-stage injection (i.e., the first after injection) at the timing in which at least the part of the injected fuel reaches within the cavities, the afterburn time period is shortened and improves the torque and the fuel consumption. Furthermore, by combining the first and second after injections, even under the disadvantageous condition regarding suppressing the generation of the soot because of the first after injection, the second after injection promotes the oxidation of the soot as described above and can reduce the discharge of the soot as much as possible within the operating range E. The timing of the main injection within the operating range E is set earlier than the timing of the main injection of the operating range D so as to mainly improve the torque, therefore, the ignition delay is shortened and it is disadvantageous regarding suppressing the generation of the soot within the operating range E. However, by performing the above described second after injection, the discharge of the soot can be reduced as much as possible within the range E.

Second Embodiment

Figure 14:
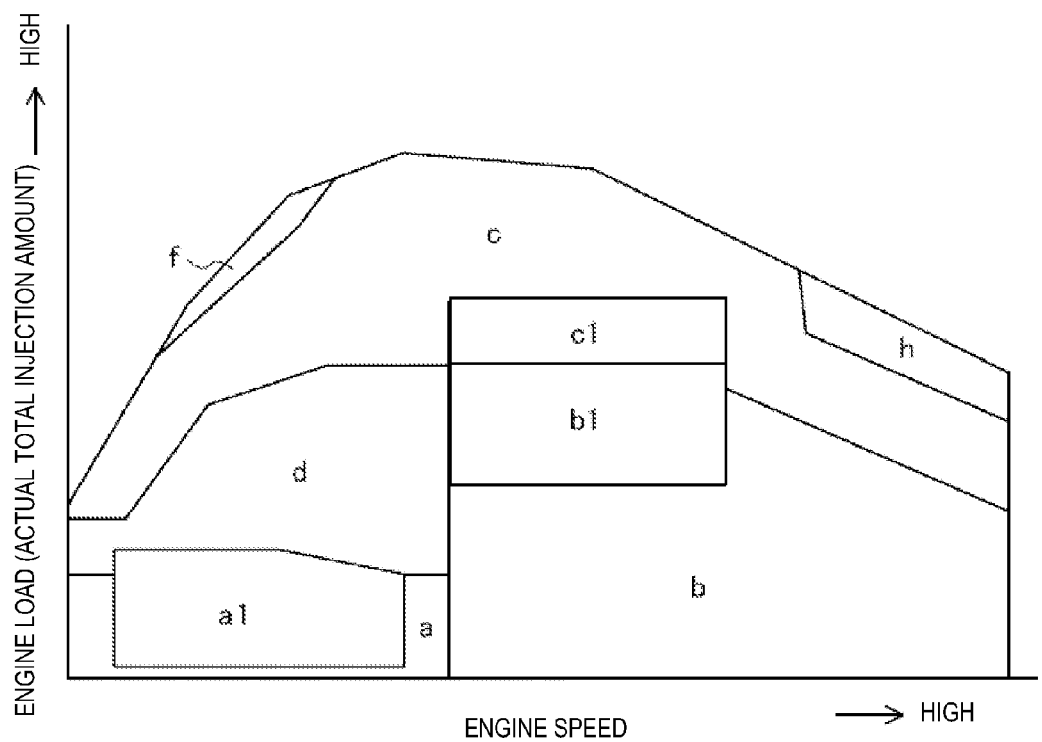
FIG. 14 is a map showing fuel injection modes of the injectors according to a second embodiment.

FIG. 14 is a map showing fuel injection modes of the injectors 18 according to a second embodiment. The map of FIG. 14 corresponds to the engine 1 under the warmed-up state similar to the map of FIG. 3. According to the map of FIG. 14, a premixed combustion is caused within a range a1 where the engine load and speed are relatively low. Further according to the map of FIG. 14, the EGR gas is introduced into the cylinders 11a within an operating range a, the operating range a1 and an operating range d. Particularly within the operating range a1 where the premixed combustion is caused, the internal EGR control is performed. Hereinafter, the fuel injection modes of the respective operating ranges are described in detail with reference to FIGS. 15 to 23.

Figure 15:
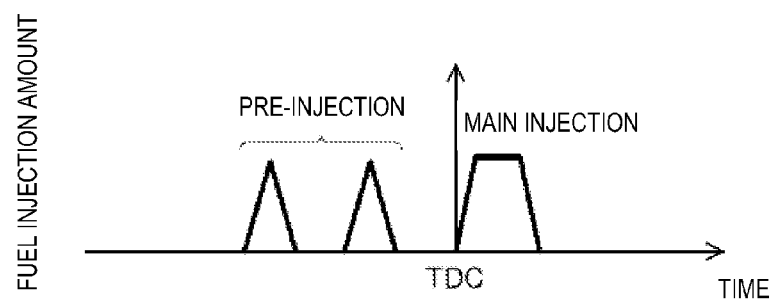
FIG. 15 is a chart showing an example of the fuel injection mode within the operating range a in the map of FIG. 14.

FIG. 15 shows the fuel injection mode within the operating range a. Within the operating range a, the pre-injection is performed twice during the compression stroke, and the main injection is performed at near the TDC in the compression stroke. That is, the total of three fuel injections are performed within the operating range a. Note that, the after injection may be performed once after the main injection so as to shorten the afterburn time period in the main combustion.

Figure 16:
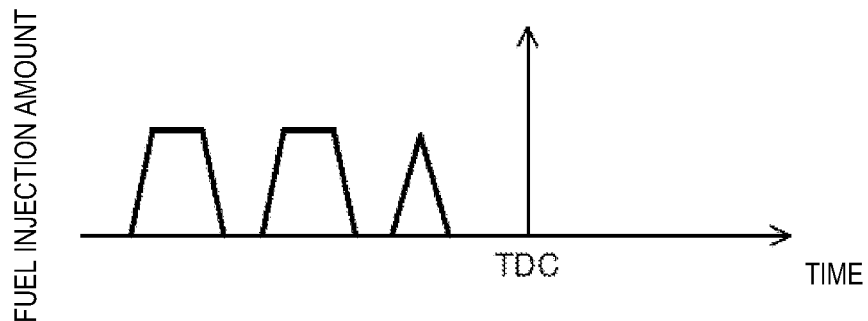
FIG. 16 is a chart showing an example of the fuel injection mode within the operating range a1 in the map of FIG. 14.

FIG. 16 shows the fuel injection mode within the operating range a1. Within the operating range a1, the premixed combustion is caused as described above. Therefore, the fuel injection is performed for a plurality of times (three times in FIG. 16) during the compression stroke and the fuel injections are completed before the fuel ignites. Here, among the plurality of fuel injections, the fuel injection amount that is injected at a relatively early timing is set relatively large and the fuel injection amount that is injected at a relatively post-stage timing is set relatively less so that the premixture level of the fuel is improved by injecting the fuel as much as possible in the early stage. The injected fuel thus self-ignites at near the TDC in the compression stroke under a state where the fuel is sufficiently mixed with air and combusts. In the premixed combustion, an atmosphere where the fuel is mixed uniformly can be generated prior to the ignition of the fuel and the ratio of the fuel amount to the air amount is reduced to be comparatively low, and, thereby, the incomplete combustion of the fuel and the generation of the soot are suppressed. The premixture combustion is beneficial in view of the fuel consumption and the emission; however, because the time required for spreading the fuel uniformly needs to be secured, the premixture combustion is utilized when the engine load is comparatively low and the engine speed is comparatively low. Note that, when an engine idling speed is significantly low or the engine speed becomes slightly faster, and the engine load is significantly low, the stability of the premixed combustion cannot be secured, therefore, a diffusion combustion is caused within the operating range a.

Figure 17:
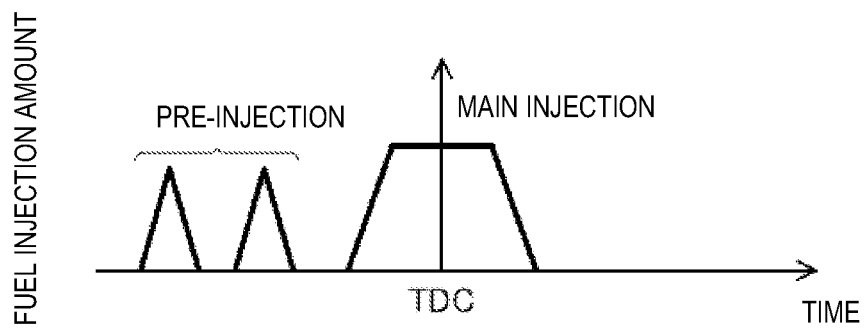
FIG. 17 is a chart showing an example of the fuel injection mode within the operating range b in the map of FIG. 14.

FIG. 17 shows the fuel injection mode within an operating range b. The operating range b is the comparatively high engine speed range corresponding to the operating range B (the operating range B where the engine speed is high) in the map of FIG. 3. Within the operating range b, the pre-injection is performed twice during the compression stroke and the main injection is performed once at near the TDC in the compression stroke. The two pre-injections cause the pre-combustion with a sufficient heat release rate at a predetermined timing so as to improve a stability of the main combustion and to reduce the increase of the heat release rate.

Figure 18:
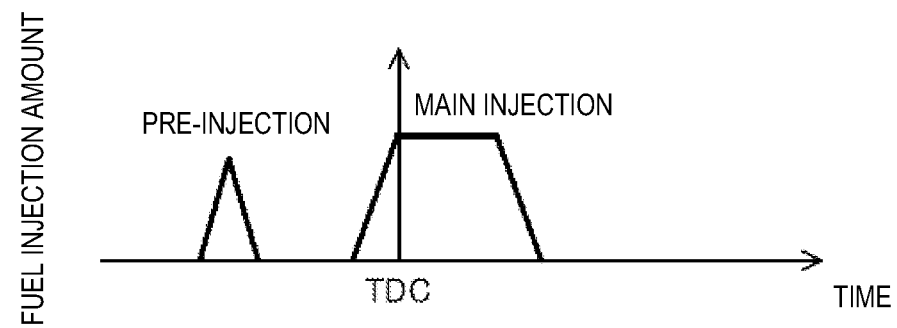
FIG. 18 is a chart showing an example of the fuel injection mode within the operating range c in the map of FIG. 14.

FIG. 18 shows the fuel injection mode within an operating range c. The operating range c is the high engine speed range corresponding to the operating range C, the operating range B where the engine load is high and the operating range G, which is the full engine load range, in the map of FIG. 3. Within the operating range c, the pre-injection is performed once during the compression stroke and the main injection is performed at near the TDC in the compression stroke, and, thereby, the total of two fuel injections are performed. Thus, the stability of the main combustion is improved and, the rapid increase of the heat release rate is avoided, thereby benefiting in improving the NVH performance.

Figure 19:
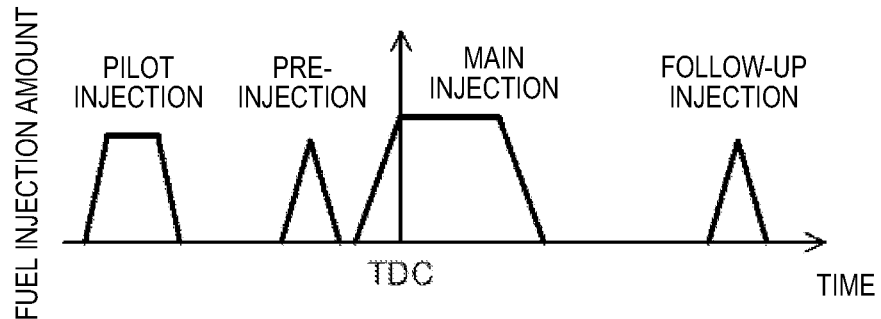
FIG. 19 is a chart showing an example of the fuel injection mode within the operating range d in the map of FIG. 14.

FIG. 19 shows the fuel injection mode within an operating range d. The operating range d is the higher engine speed range relative to the operating range a1 within the low engine speed range when the engine speed is divided into two: the low engine speed range and the high engine speed range. The operating range d corresponds to the operating ranges D and E in the map of FIG. 3. Within the operating range d, the pilot injection that is performed at a comparatively early timing during the compression stroke and the pre-injection that is performed at a timing close to the TDC in the compression stroke are performed once each as the pre-stage injections, the main injection is performed at near the TDC in the compression stroke, and then, the post-stage injection is performed with a predetermined time interval. The pilot injection is beneficial in suppressing the soot, and the combination of the pilot injection and the pre-injection contributes to improving the NVH performance by causing the sufficient pre-combustion before the main combustion. The post-stage injection is a follow-up injection corresponding to the second after injection in the fuel injection mode of FIG. 8. The follow-up injection has a function to extend the main combustion and suppress the temperature decrease in the cylinders 11a so as to keep the temperatures in the cylinders 11a high in the expansion stroke, and thereby, the oxidation of the soot is promoted in a later stage of the combustion stroke.

Here, when comparing the operating ranges a and d, the operating range d corresponds to the range where the engine load is high relative to the operating range a. With respect to the fuel injection mode within the operating range a, the post-stage injection, which is not performed within the operating range a, may be performed in the fuel injection mode within the operating range d while the fuel injection ratio of the pre-stage injections to the main injection of the operating range d is reduced relative to the injection ratio within the operating range a. Specifically, when assuming the total fuel injection amount within the operating range a is 10Q, the fuel amount ratio of the three fuel injections is, for example, 2:2:6 in the order of the injection. Therefore, the injection ratio of the pre-stage injections to the main injection within the operating range a is 4/6 (=2/3). Further, when assuming the total fuel injection amount within the operating range d is 30Q, the fuel amount of the four fuel injections is, for example, 5:1:21:3 in the order of the injection. Therefore, the injection ratio of the pre-stage injections to the main injection within the operating range d is 6/21. That is, the injection ratio for the pre-stage injections of the operating range d is smaller than that of the operating range a. Further, while the injection ratio for the pre-stage injections is reduced, the post-stage injection is added within the operating range d. Thus, changing the fuel injection mode according to the level of the engine load within the operating ranges where the EGR control is performed is beneficial in achieving both of the reduction in the discharge of the soot and the improvement of the NVH performance.

Further, when comparing the operating ranges c and d, the operating range c has the engine load higher than the operating range d and within which the EGR control is stopped, while the EGR control is performed within the operating range d. Thus, in the fuel injection mode within the operating range c, the injection ratio of the pre-stage injections to the main injection is reduced by reducing the number of the pre-stage injections with respect to that of the fuel injection mode within the operating range d, and therefore, the excessive pre-combustion is avoided and improves the NVH performance.

Figure 20:
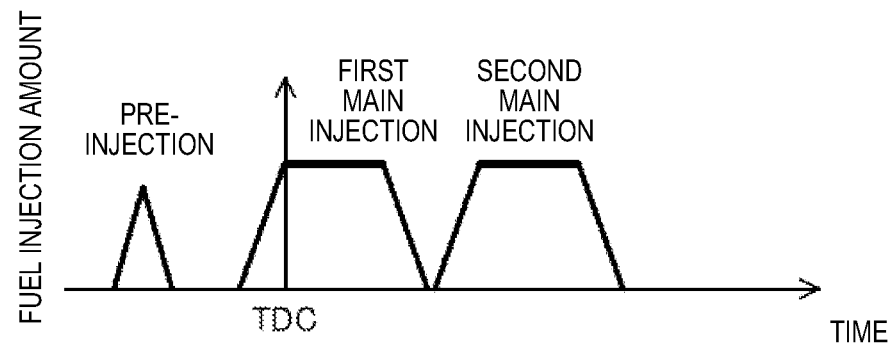
FIG. 20 is a chart showing an example of the fuel injection mode within the operating range f in the map of FIG. 14.

FIG. 20 shows the fuel injection mode within an operating range f. The operating range f corresponds to the operating range F in the map of FIG. 3. Similar to the operating range F, the pre-injection is performed once and the main injection is divided and they are to be performed two separate times, that is the total of three fuel injections are performed, within the operating range f. Thus, it is beneficial in improving the NVH performance within the relatively low engine speed range within the high engine load range (including the full load).

Figure 21:
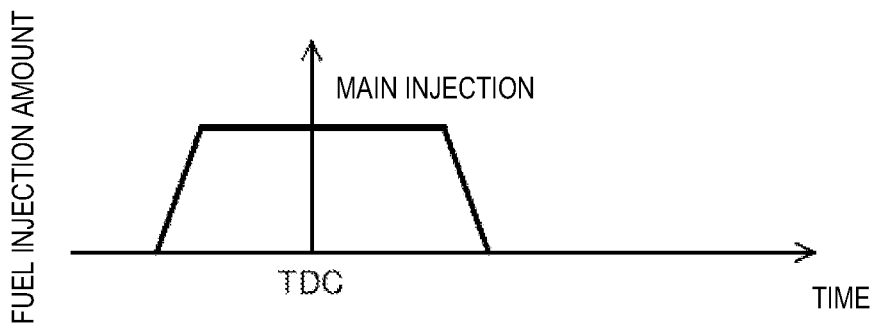
FIG. 21 is a chart showing an example of the fuel injection mode within the operating range h in the map of FIG. 14.

FIG. 21 shows the fuel injection mode within an operating range h. The operating range h corresponds to the operating range H in the map of FIG. 3. Similar to the operating range H, by performing the single main injection at near the TDC in the compression stroke, an engine output is increased while particularly improving the robustness so as to secure the highest torque within the operating range h.

Figure 22:
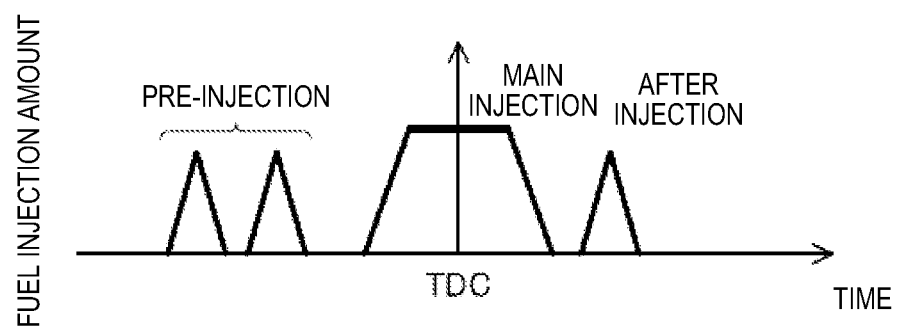
FIG. 22 is a chart showing an example of the fuel injection mode within the operating range b1 in the map of FIG. 14.

FIG. 22 shows the fuel injection mode within the operating range b1. Within the operating range b1, the pre-injection is performed twice during the compression stroke, the main injection is performed at near the TDC in the compression stroke, and the post-stage injection is performed after the main injection, that is the total of four fuel injections are performed. The fuel injection mode of the range b1 corresponds to the fuel injection mode of the operating range b (see FIG. 17) with an additional post-stage injection. Here, the post-stage injection is different from the one in the fuel injection mode in FIG. 19 and performed at a timing comparatively closer to the main injection. The post-stage injection in FIG. 22 corresponds to the first after injection in the fuel injection mode in FIG. 8. That is, an afterburn time period of the main combustion is shortened to be beneficial in improving the fuel consumption.

Figure 23:
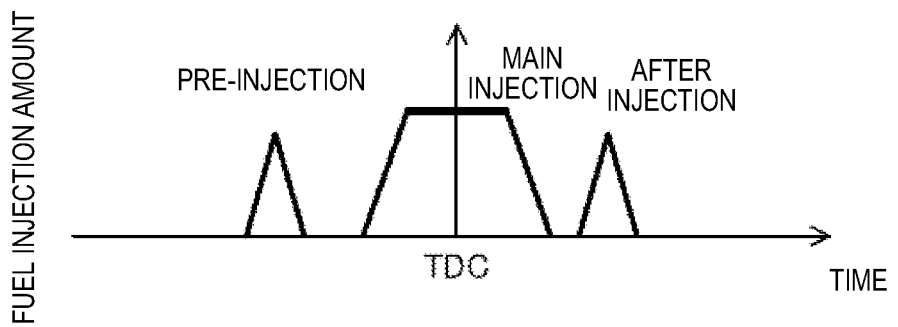
FIG. 23 is a chart showing an example of the fuel injection mode within the operating range c1 in the map of FIG. 14.

FIG. 23 shows the fuel injection mode within an operating range c1. Within the operating range c1, the pre-injection is performed once during the compression stroke, the main injection is performed at near the TDC in the compression stroke, and the post-stage injection is performed after the main injection, that is the total of three fuel injections are performed. The fuel injection mode of the range c1 corresponds to the fuel injection mode of the operating range c (see FIG. 18) with an additional post-stage injection. The fuel injection mode of the range c1 is also for improving the fuel consumption.

Figure 24:
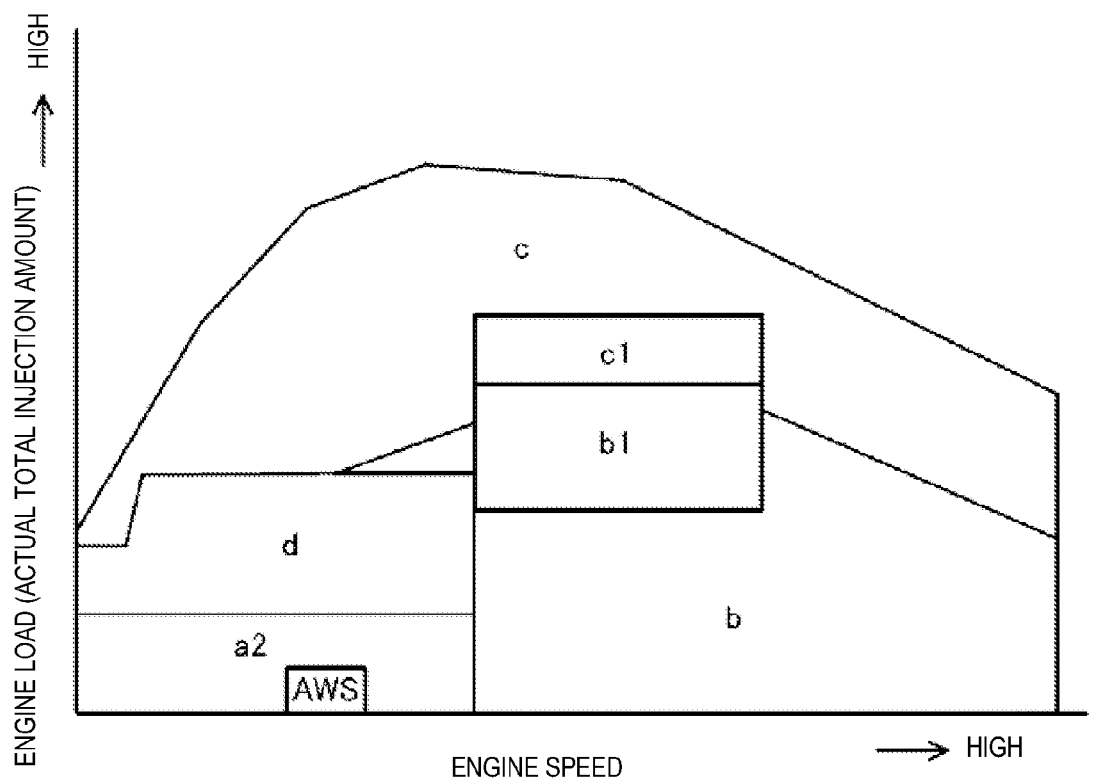
FIG. 24 is an example of a map of fuel injection modes when the engine is under a warming-up state according to the second embodiment.

FIG. 14 is the map of the fuel injection modes when the engine 1 is under the warmed-up state. FIG. 24 is a map of fuel injection modes when the engine 1 is under a warming up state. When the engine is under the warming up state, the temperatures in the cylinders 11a are low and the ignition of the premixed combustion cannot be controlled, and therefore the operating range for the premixed combustion is removed.

The operating ranges b, c, d, b1 and c1 in the map of FIG. 24 correspond to the operating ranges b, c, d, b1 and c1 in the map of FIG. 14, respectively, and the fuel injection modes of the operating ranges corresponding to each other are the same (see FIGS. 17, 18, 19, 22 and 23).

Figure 25:
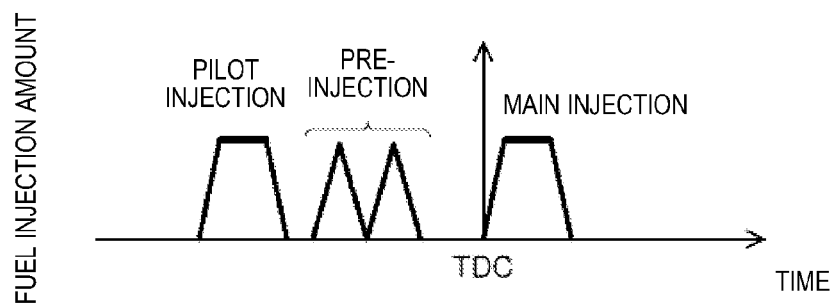
FIG. 25 is a chart showing an example of the fuel injection mode within the operating range a2 in the map of FIG. 24.

Within an operating range a2 where the engine load and the engine speed are low in the map of FIG. 24, a fuel injection mode as shown in FIG. 25 is set. Here, the pilot injection with comparatively large injection amount is performed, the pre-injection is performed twice, and the main injection is performed once, that is the total of four fuel injections are performed. By increasing the number of the pre-stage injections and the injection ratio for the pre-stage injection, an ignitability is improved and a misfire resistance is improved. Note that, an Accelerated Warm-up System (AWS) range is set within the operating range a2.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling an automobile-mount diesel engine with a turbocharger, the engine being supplied with fuel containing diesel fuel as a main component, comprising:
   a. when the engine is within a range where a load is relatively low within a predetermined operating range where a rotation speed is low and the load is partial, the method including:
      switching to a first injection mode that includes introducing EGR gas into a cylinder of the engine;
      performing a main injection where the fuel is injected at or near a top dead center in a compression stroke to cause a main combustion that mainly includes a diffusion combustion; and
      performing a pre-stage injection where the fuel is injected prior to the main injection according to a predetermined injection ratio with respect to a fuel injection amount of the main injection; and
   b. when the engine is within a range where the load is relatively high within the predetermined operating range, the method including:
      switching to a second injection mode that includes introducing the EGR gas into the cylinder of the engine, performing the main injection,
      performing the pre-stage injection with an injection ratio lower than an injection ratio in the first injection mode, and
      performing a post-stage injection where the fuel is injected after the main injection to extend the main combustion; and
   c. when the engine is at a timing in which the injected fuel reaches outside a cavity formed in a top surface of a piston, the method including:
      partially performing the post-stage injection.

2. The method of claim 1, wherein the first injection mode includes a number of pre-stage injections, and the second injection mode includes a lesser number of pre-stage injections than the number of pre-stage injections in the first injection mode.

3. The method of claim 1, wherein the operating range of the engine body is divided into a low rotation speed range and a high rotation speed range, and wherein the predetermined operating range is a relatively high rotation speed range within the low rotation speed range.

4. The method of claim 1, wherein, in the first injection mode, an injection control module performs the post-stage injection at a timing in which at least a part of the injected fuel reaches within the cavity, and, in the second injection mode, the injection control module performs the post-stage injection twice at the timing in which at least the part of the injected fuel reaches within the cavity and the timing in which the injected fuel reaches outside the cavity of the piston.

5. The method of claim 1, wherein a timing of performing the main injection is earlier in the second injection mode than in the first injection mode.

6. The method of claim 1, wherein, within an operating range where the load is higher compared to the predetermined operating range, the introduction of the EGR gas into the cylinder is stopped and the injection ratio for the pre-stage injection is reduced to be lower than an injection ratio in the second injection mode.

7. The method of claim 6, wherein, within the operating range where the load is higher compared to the predetermined operating range, the number of the pre-stage injections is reduced to be less than a number of injections in the second injection mode.

8. An automobile-mount diesel engine with a turbocharger, comprising:
an engine body with the turbocharger, the engine body being mounted in the automobile and supplied with fuel containing diesel fuel as a main component;
a fuel injection valve arranged in the engine body so as to be oriented toward a cylinder of the engine body and for directly injecting the fuel into the cylinder;
an injection control module for controlling a mode of injecting the fuel into the cylinder through the fuel injection valve; and
an EGR amount control module for adjusting an amount of EGR gas introduced into the cylinder;
wherein, when the engine body is at least within a predetermined operating range where a rotation speed is low and a load is partial, the EGR amount control module introduces the EGR gas into the cylinder, and the injection control module performs a main injection where the fuel is injected at or near a top dead center in a compression stroke to cause a main combustion mainly including a diffusion combustion and performs a pre-stage injection where the fuel is injected prior to the main injection;
wherein, within a range where the load is relatively low within the predetermined operating range, the injection control module also switches to a first injection mode in which the pre-stage injection with a predetermined injection ratio with respect to a fuel injection amount of the main injection is performed, and, within a range where the load is relatively high within the predetermined operating range, the injection control module switches to a second injection mode in which an injection ratio for the pre-stage injection is reduced to be lower than the predetermined injection ratio in the first injection mode and a post-stage injection where the fuel is injected after the main injection to extend the main combustion is performed; and
wherein the post-stage injection is partially performed at a timing in which the injected fuel reaches outside a cavity formed in a top surface of a piston inserted into the cylinder.

9. The diesel engine of claim 8, wherein the first injection mode includes a number of pre-stage injections, and the second injection mode includes a lesser number of pre-stage injections than the number of pre-stage injections in the first injection mode.

10. The diesel engine of claim 8, wherein the predetermined operating range is a relatively high rotation speed range within a low rotation speed range when the operating range of the engine body is divided into the low rotation speed range and a high rotation speed range.

11. The diesel engine of claim 8, wherein, in the first injection mode, the injection control module performs the post-stage injection at a timing in which at least a part of the injected fuel reaches within the cavity, and, in the second injection mode, the injection control module performs the post-stage injection twice at the timing in which at least the part of the injected fuel reaches within the cavity and the timing in which the injected fuel reaches outside the cavity of the piston.

12. The diesel engine of claim 8, wherein the timing of performing the main injection is earlier in the second injection mode than in the first injection mode.

13. The diesel engine of claim 8, wherein, within an operating range where the load is higher compared to the predetermined operating range, the EGR amount control module stops introducing the EGR gas into the cylinder and the injection control module reduces the injection ratio for the pre-stage injection to be lower than an injection ratio in the second injection mode.

14. The diesel engine of claim 13, wherein, within the operating range where the load is higher compared to the predetermined operating range, the injection control module reduces the number of the pre-stage injections to be less than a number of injections in the second injection mode.

* * * * *